US012595639B2

(12) United States Patent
Onodera et al.

(10) Patent No.: US 12,595,639 B2
(45) Date of Patent: Apr. 7, 2026

(54) SHOVEL AND CONSTRUCTION ASSISTING SYSTEM OF SHOVEL

(71) Applicant: SUMITOMO HEAVY INDUSTRIES, LTD., Tokyo (JP)

(72) Inventors: Masaru Onodera, Kanagawa (JP); Yusuke Sano, Kanagawa (JP); Keiji Honda, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 156 days.

(21) Appl. No.: 18/473,547

(22) Filed: Sep. 25, 2023

(65) Prior Publication Data

US 2024/0011245 A1 Jan. 11, 2024

Related U.S. Application Data

(63) Continuation of application No. PCT/JP2022/013630, filed on Mar. 23, 2022.

(30) Foreign Application Priority Data

Mar. 26, 2021 (JP) ................................. 2021-054358

(51) Int. Cl.
*E02F 9/20* (2006.01)
*E02F 9/22* (2006.01)
*H04N 7/18* (2006.01)

(52) U.S. Cl.
CPC ................ *E02F 9/205* (2013.01); *E02F 9/22* (2013.01); *H04N 7/181* (2013.01); *E02F 9/2228* (2013.01);

(Continued)

(58) Field of Classification Search
CPC ....... E02F 9/20; E02F 9/22; E02F 9/26; E02F 9/205; E02F 9/2228; E02F 9/2285; E02F 9/2292; E02F 9/2296; H04N 7/181
See application file for complete search history.

(56) References Cited

U.S. PATENT DOCUMENTS

2017/0043790 A1* 2/2017 Morisaki ............... B60W 10/08
2017/0073925 A1* 3/2017 Friend ..................... E02F 9/261
(Continued)

FOREIGN PATENT DOCUMENTS

JP H04-030036 2/1992
JP 2002-285586 10/2002
(Continued)

OTHER PUBLICATIONS

International Search Report for PCT/JP2022/013630 mailed on Jun. 14, 2022.

*Primary Examiner* — Scott A Browne
*Assistant Examiner* — Jason Nguyen
(74) *Attorney, Agent, or Firm* — IPUSA, PLLC

(57) ABSTRACT

A shovel includes a lower traveling body, an upper turning body turnably mounted on the lower traveling body, traveling hydraulic motors as traveling actuators for driving the lower traveling body, and a controller as a control device provided in the upper turning body. The controller is configured to determine a front and rear of a traveling direction in accordance with a direction of the upper turning body and to perform travel control such that the rear of the upper turning body is positioned forward in the traveling direction.

13 Claims, 13 Drawing Sheets

(52) U.S. Cl.
CPC ........... *E02F 9/2285* (2013.01); *E02F 9/2292*
(2013.01); *E02F 9/2296* (2013.01)

(56) References Cited

U.S. PATENT DOCUMENTS

2019/0284782 A1 * 9/2019 Izumikawa ............. F15B 11/10
2021/0010241 A1    1/2021 Nishi

FOREIGN PATENT DOCUMENTS

| JP | 2002285586 A * | 10/2002 |
|----|----------------|---------|
| JP | 2004-132003 | 4/2004 |
| JP | 2006-219894 | 8/2006 |
| JP | 2006219894 A * | 8/2006 |
| JP | 2022-060896 | 4/2022 |
| KR | 10-2006-0096546 | 9/2006 |
| WO | 2019/189935 | 10/2019 |

* cited by examiner

SHOVEL AND CONSTRUCTION ASSISTING SYSTEM OF SHOVEL

CROSS-REFERENCE TO RELATED APPLICATIONS

The present application is a continuation application filed under 35 U.S.C. 111 (a) claiming benefit under 35 U.S.C. 120 and 365 (c) of PCT International Application No. PCT/JP2022/013630 filed on Mar. 23, 2022 and designating the U.S., which claims priority to Japanese Patent Application No. 2021-054358 filed on Mar. 26, 2021. The entire contents of the foregoing applications are incorporated herein by reference.

BACKGROUND OF THE INVENTION

1. Field of the Invention

The present disclosure relates to a shovel and a construction assisting system of the shovel.

2. Description of the Related Art

Conventionally, shovels capable of autonomous traveling are known.

SUMMARY OF THE INVENTION

The controller mounted on the above-described shovel is configured to determine a traveling route, a traveling speed, and the like of the shovel while acquiring information about unevenness and the like of a road surface based on an image captured by a front camera attached to a front end of an upper surface of a cabin when the shovel is moved forward.

However, since an attachment is attached to the front side of the shovel, the front camera cannot capture a part of the front space which is hidden behind the attachment and becomes a blind spot. Therefore, the controller may not be able to appropriately move the shovel.

Therefore, it is desirable to move the shovel more appropriately.

A shovel according to an embodiment of the present disclosure includes a lower traveling body; an upper turning body turnably mounted on the lower traveling body; a traveling actuator configured to drive the lower traveling body; and a control device provided on the upper turning body, wherein the control device is configured to determine a front and a rear in a traveling direction in accordance with a direction of the upper turning body, and to perform travel control such that the rear of the upper turning body is to be positioned forward in the traveling direction.

The shovel can be moved more appropriately by the above-described configurations.

DETAILED DESCRIPTION OF THE INVENTION

Figure 1:
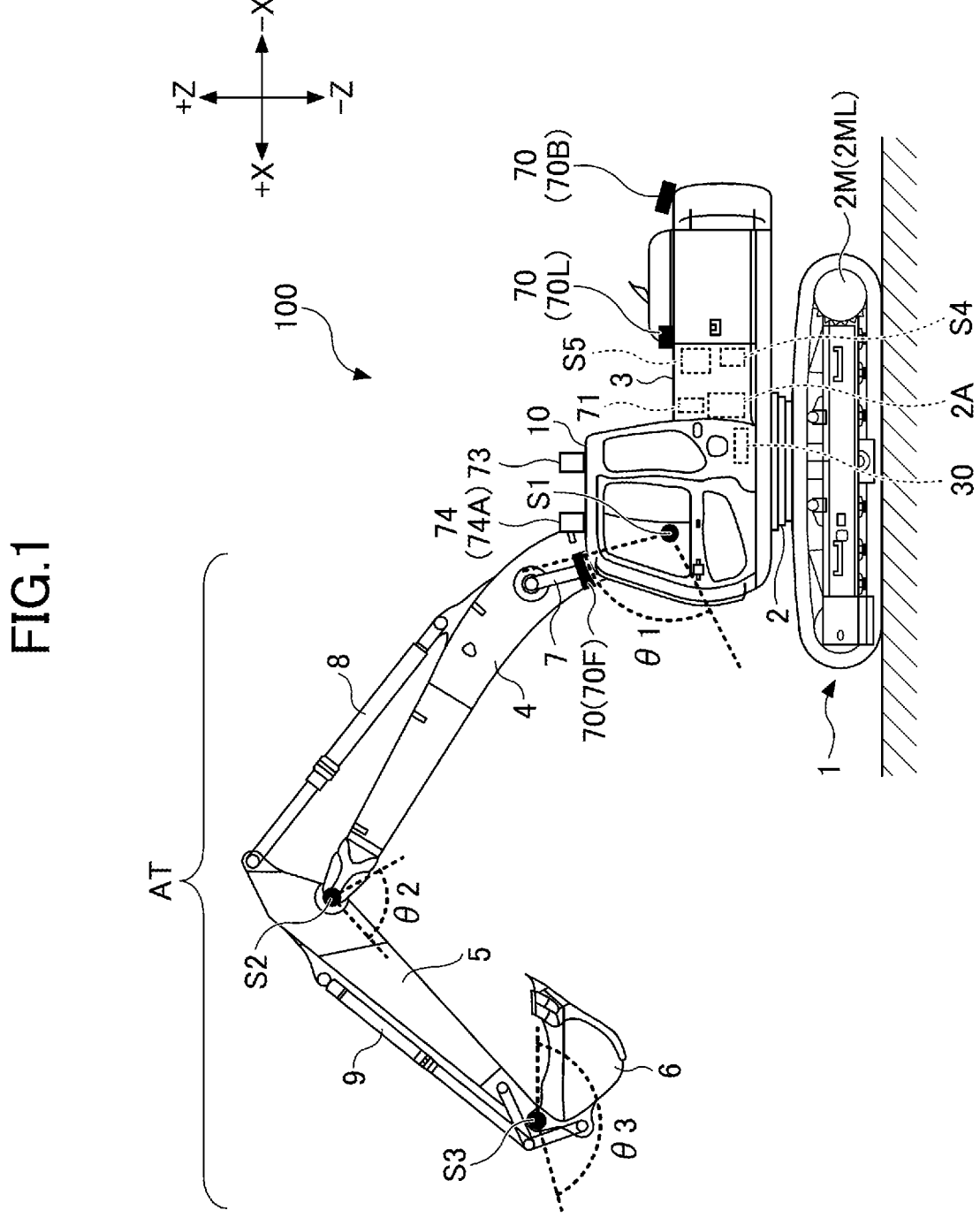
FIG. 1 is a side view of a shovel according to an embodiment of the present disclosure.
Figure 2:
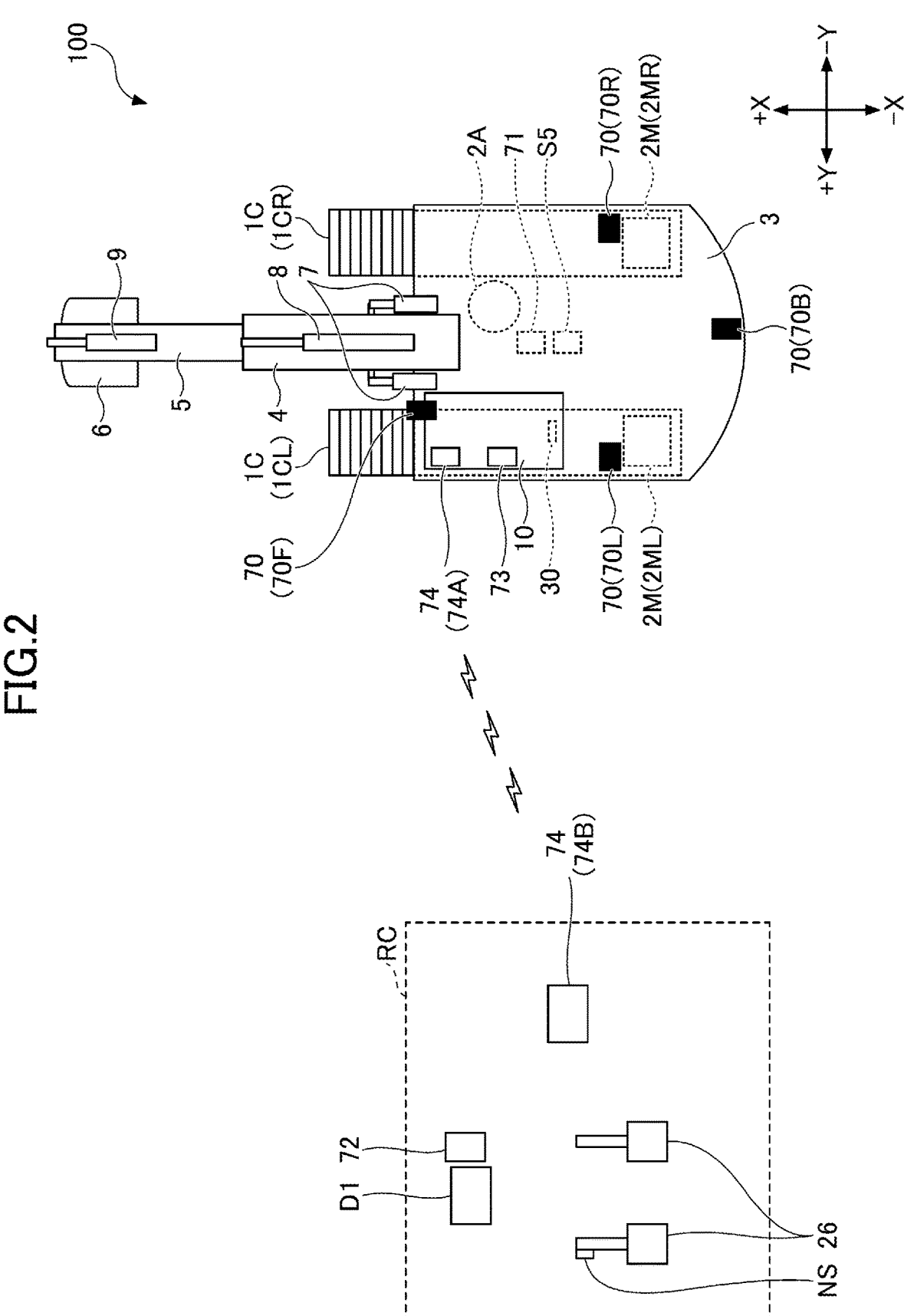
FIG. 2 is a top view of the shovel of FIG. 1.

First, a shovel 100 as an excavator according to an embodiment of the present disclosure will be described with reference to FIGS. 1 and 2. FIG. 1 is a side view of the shovel 100, and FIG. 2 is a top view of the shovel 100. In the present embodiment, the shovel 100 is configured to also function as a remotely operated shovel.

In the present embodiment, a lower traveling body 1 of the shovel 100 includes crawlers 1C. The crawlers 1C are driven by traveling hydraulic motors 2M as traveling actuators mounted on the lower traveling body 1. In particular, the crawlers 1C include a left crawler 1CL and a right crawler 1CR. The left crawler 1CL is driven by a left traveling hydraulic motor 2ML, and the right crawler 1CR is driven by a right traveling hydraulic motor 2MR.

An upper turning body 3 is turnably mounted on the lower traveling body 1 via a turning mechanism 2. The turning mechanism 2 is driven by a turning hydraulic motor 2A as a turning actuator mounted on the upper turning body 3. However, the turning actuator may be a turning motor-generator as an electric actuator.

A boom 4 is attached to the upper turning body 3. An arm 5 is attached to a distal end of the boom 4, and a bucket 6 as an end attachment is attached to a distal end of the arm 5. The boom 4, the arm 5, and the bucket 6 constitute an excavation attachment AT which is an example of an attachment. The boom 4 is driven by a boom cylinder 7, the arm 5 is driven by an arm cylinder 8, and the bucket 6 is driven by a bucket cylinder 9. The boom cylinder 7, the arm cylinder 8, and the bucket cylinder 9 constitute an attachment actuator.

The boom 4 is supported so as to be vertically rotatable with respect to the upper turning body 3. A boom angle sensor S1 is attached to the boom 4. The boom angle sensor S1 can detect a boom angle $\theta 1$ which is a rotation angle of the boom 4. The boom angle $\theta 1$ is, for example, an elevation angle from a state in which the boom 4 is most lowered. Therefore, the boom angle $\theta 1$ becomes maximum when the boom 4 is lifted to the maximum.

The arm 5 is rotatably supported with respect to the boom 4. An arm angle sensor S2 is attached to the arm 5. The arm angle sensor S2 can detect an arm angle $\theta 2$ which is a rotation angle of the arm 5. The arm angle $\theta 2$ is, for example, an opening angle from a state where the arm 5 is most closed. Therefore, the arm angle $\theta 2$ becomes maximum when the arm 5 is opened most.

The bucket 6 is rotatably supported with respect to the arm 5. A bucket angle sensor S3 is attached to the bucket 6. The bucket angle sensor S3 can detect a bucket angle $\theta 3$ which is a rotation angle of the bucket 6. The bucket angle θ3 is an opening angle of the bucket 6 from the most closed state. Therefore, the bucket angle θ3 becomes maximum when the bucket 6 is most opened.

In the embodiment of FIG. 1, each of the boom angle sensor S1, the arm angle sensor S2, and the bucket angle sensor S3 is configured by a combination of an accelerometer sensor and a gyro sensor. However, each of the angle sensors may be configured by only the acceleration sensor. Further, the boom angle sensor S1 may be a stroke sensor attached to the boom cylinder 7, or may be a rotary encoder, a potentiometer, an inertial measurement device, or the like. The same applies to the arm angle sensor S2 and the bucket angle sensor S3.

The upper turning body 3 is provided with a cabin 10 as an operator's cabin, and is mounted with a power source such as an engine 11. The cabin 10 is included in the upper turning body 3. Since the shovel 100 is configured to function as a remote-controlled shovel, the cabin 10 may be omitted. In addition, a space recognition device 70, a direction detection device 71, a position measurement device 73, a communication device 74A, a machine body inclination sensor S4, a turning angular velocity sensor S5, and the like are attached to the upper turning body 3. In this specification, for the sake of convenience, the side of the upper turning body 3 to which the excavation attachment AT is attached is referred to as the front side of the upper turning body 3, and the side to which a counterweight is attached is referred to as the rear side of the upper turning body 3. In addition, in the lower traveling body 1, a side on which the traveling hydraulic motor 2M is mounted is referred to as a rear side of the lower traveling body 1, and a side on which the traveling hydraulic motor 2M is not mounted is referred to as a front side of the lower traveling body 1.

The communication device 74A is configured to control communication between the shovel 100 and an external device. In the present embodiment, the shovel 100 is wirelessly connected to an operation device 26, an information input device 72, a display device D1, a sound outputting device D2, and the like provided in a remote control room RC via the communication device 74A and a communication device 74B provided in the remote control room RC as illustrated in FIG. 2. The operation device 26, the information input device 72, the display device D1, the sound outputting device D2, and the like provided in the remote control room RC constitute a construction assisting system for the shovel 100. Hereinafter, the communication device 74A attached to the shovel 100 and the communication device 74B provided in the remote control room RC may be collectively referred to as a "communication device 74". Further, in the present embodiment, the shovel 100 is configured to also function as a normal shovel that is not a remote-controlled shovel. For this reason, devices similar to the operation device 26, the information input device 72, the display device D1, the sound outputting device D2, and the like are mounted in the cabin 10.

The space recognition device 70 is configured to recognize an object present in a three-dimensional space around the shovel 100. The space recognition device 70 is configured to calculate a distance from the space recognition device 70 or the shovel 100 to the recognized object. The space recognition device 70 is, for example, an ultrasonic sensor, a millimeter wave radar, a monocular camera, a stereo camera, a LIDAR, a distance image sensor, an infrared sensor, or the like, or a combination thereof. When a LIDAR is used as the space recognition device 70, the space recognition device 70 is configured to emit a large number of laser beams in a large number of directions, receive reflected light thereof, and calculate a distance and a direction of an object from the reflected light. The same applies to a case where a millimeter wave radar or the like as the space recognition device 70 emits an electromagnetic wave toward an object.

The space recognition device 70 may be configured to image the surroundings of the shovel 100. In this case, the space recognition device 70 is, for example, a monocular camera including an imaging device such as a CCD, a CMOS, or the like, and outputs a captured image to the display device D1. In the present embodiment, the space recognition device 70 is a camera (monocular camera) as an imaging device. In particular, the space recognition device 70 includes a front camera 70F attached to the front end of the upper surface of the cabin 10, a rear camera 70B attached to the rear end of the upper surface of the upper turning body 3, a left camera 70L attached to the left end of the upper surface of the upper turning body 3, and a right camera 70R attached to the right end of the upper surface of the upper turning body 3. An upper camera that recognizes an object present in a space above the upper turning body 3 may be attached to the shovel 100.

The space recognition device 70 may be configured to be able to detect a predetermined object in a predetermined region set around the shovel 100. That is, the space recognition device 70 may be configured to be able to identify at least one of a type, a position, a shape, and the like of an object. For example, the space recognition device 70 may be configured to be able to distinguish between a person and an object other than a person. Furthermore, the space recognition device 70 may be configured to be able to specify the type of terrain around the shovel 100. The type of terrain is, for example, a hole, an inclined surface, a river, or the like. Furthermore, the space recognition device 70 may be configured to be able to specify the type of obstacle. The type of the obstacle is, for example, an electric wire, a utility pole, a person, an animal, a vehicle, work equipment, a construction machine, a building, a fence, or the like. Furthermore, the space recognition device 70 may be configured to be able to specify the type, size, or the like of a dump truck as a vehicle. Further, the space recognition device 70 may be configured to detect a person by recognizing a helmet, a safety vest, work clothes, or the like, or by recognizing a predetermined mark or the like on the helmet, the safety vest, the work clothes, or the like. Further, the space recognition device 70 may be configured to recognize a state of a road surface. Specifically, the space recognition device 70 may be configured to specify, for example, a type of an object present on a road surface. The types of objects present on the road surface are, for example, cigarettes, cans, PET bottles, stones, and the like. The above-described function of the space recognition device 70 may be realized by a controller 30 that receives the output of the space recognition device 70.

The direction detection device 71 is configured to detect information on a relative relationship between the direction of the upper turning body 3 and the direction of the lower traveling body 1. The information on the relative relationship between the direction of the upper turning body 3 and the direction of the lower traveling body 1 is, for example, an angle (turning angle) formed between the longitudinal axis of the lower traveling body 1 and the longitudinal axis of the upper turning body 3 in a top view. The direction detection device 71 may be configured by, for example, a combination of a geomagnetic sensor attached to the lower traveling body 1 and a geomagnetic sensor attached to the upper turning body 3. Alternatively, the direction detection device 71 may be configured by a combination of a GNSS receiver attached to the lower traveling body 1 and a GNSS receiver attached to the upper turning body 3. The direction detection device 71 may be a rotary encoder, a rotary position sensor, or the like. In a configuration in which the upper turning body 3 is driven to turn by the turning motor-generator, the direction detection device 71 may be configured by a resolver. The direction detection device 71 may be attached to, for example, a center joint provided in association with the turning mechanism 2 that realizes mechanical relative rotation between the lower traveling body 1 and the upper turning body 3.

The direction detection device 71 may be configured by a camera attached to the upper turning body 3. In this case, the direction detection device 71 performs known image processing on an image (input image) captured by the camera attached to the upper turning body 3 to detect an image of the lower traveling body 1 included in the input image. The direction detection device 71 detects the image of the lower traveling body 1 using a known image recognition technique, thereby specifying the longitudinal direction of the lower traveling body 1. Then, an angle formed between the direction of the longitudinal axis of the upper turning body 3 and the longitudinal direction of the lower traveling body 1 is derived. The direction of the longitudinal axis of the upper turning body 3 is derived from the mounting position of the camera. In particular, since the crawler 1C protrudes from the upper turning body 3, the direction detection device 71 can specify the longitudinal direction of the lower traveling body 1 by detecting the image of the crawler 1C. In this case, the direction detection device 71 may be integrated into the controller 30.

The information input device 72 is configured to allow an operator of the shovel to input information to the controller 30. In the present embodiment, the information input device 72 is a switch panel provided close to the display unit of the display device D1. However, the information input device 72 may be a touch panel disposed on the display unit of the display device D1, or may be a voice input device such as a microphone or the like. Further, the information input device 72 may be a communication device. In this case, the operator can input information to the controller 30 via a communication terminal such as a smartphone or the like.

The position measurement device 73 is configured to measure a current position of the shovel 100. In the present embodiment, the position measurement device 73 is a GNSS receiver, detects the position of the upper turning body 3, and outputs the detected value to the controller 30. The position measurement device 73 may be a GNSS compass. In this case, the position measurement device 73 can detect the position and the direction of the upper turning body 3.

The machine body inclination sensor S4 detects an inclination of the upper turning body 3 with respect to a predetermined plane. In the present embodiment, the machine body inclination sensor S4 is an accelerometer sensor that detects an inclination angle around a longitudinal axis and an inclination angle around a lateral axis of the upper turning body 3 with respect to a horizontal plane. For example, the longitudinal axis and the lateral axis of the upper turning body 3 are orthogonal to each other and pass through a shovel center point which is a point on the turning axis of the shovel 100.

The turning angular velocity sensor S5 detects a turning angular velocity of the upper turning body 3. In the present embodiment, the turning angular velocity sensor S5 is a gyro sensor. The turning angular velocity sensor S5 may be a resolver, a rotary encoder, or the like. The turning angular velocity sensor S5 may detect a turning velocity. The turning velocity may be calculated from the turning angular velocity.

Hereinafter, at least one of the boom angle sensor S1, the arm angle sensor S2, the bucket angle sensor S3, the machine body inclination sensor S4, and the turning angular velocity sensor S5 is also referred to as an attitude detection device. The attitude of the excavation attachment AT is detected based on, for example, the outputs of the boom angle sensor S1, the arm angle sensor S2, and the bucket angle sensor S3.

The display device D1 is a device that displays information. In the present embodiment, the display device D1 is a liquid crystal display. However, the display device D1 may be a display of a communication terminal such as a smartphone.

The sound outputting device D2 is a device that outputs sound. The sound outputting device D2 is a device that outputs sound to an operator. The sound outputting device D2 may be a speaker attached to a communication terminal. Note that a device that outputs sound to a worker who is working around the shovel 100 may be attached to the shovel 100.

The operation device 26 is a device used by an operator to operate the shovel 100. Specifically, the operation device 26 includes a device used by the operator to operate the actuator.

The controller 30 is a control device for controlling the shovel 100. In the present embodiment, the controller 30 is configured by a computer including a CPU, a RAM, an NVRAM, a ROM, and the like. Then, the controller 30 reads a program corresponding to each function from the ROM, loads the program into the RAM, and causes the CPU to execute corresponding processing. The functions include, for example, a machine guidance function that guides the operator's manual operation of the shovel 100 and a machine control function that supports the operator's manual operation of the shovel 100 or causes the shovel 100 to operate automatically or autonomously.

Figure 3:
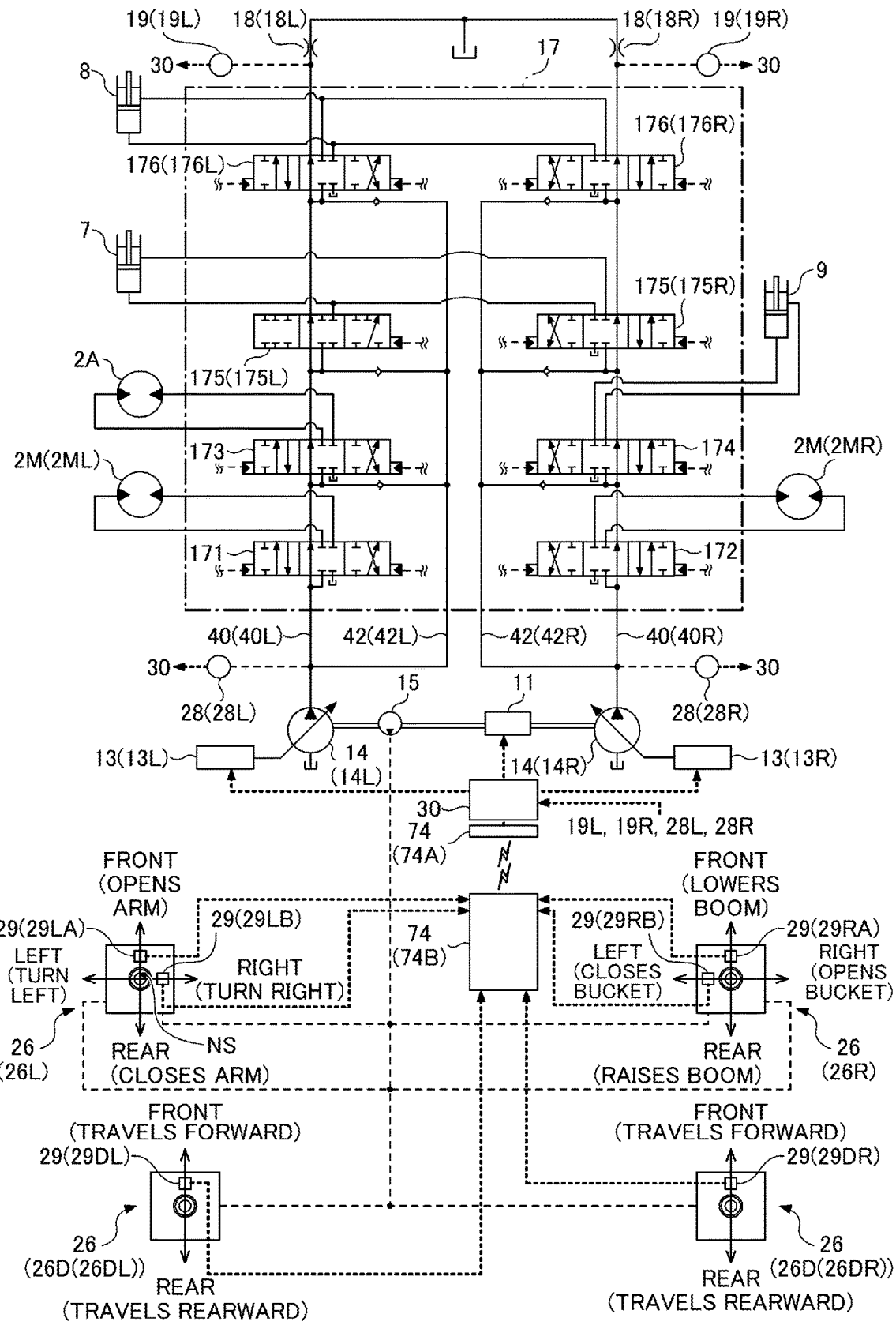
FIG. 3 is a diagram illustrating a configuration example of a drive system of the shovel of FIG. 1.

Next, a configuration example of a drive system mounted on the shovel 100 will be described with reference to FIG. 3. FIG. 3 is a diagram illustrating a configuration example of the drive system of the shovel 100. FIG. 3 illustrates the mechanical drive train, hydraulic line, pilot line, and electrical control system in double, solid, dashed, and dotted lines, respectively.

The drive system of the shovel 100 mainly includes an engine 11, regulators 13, main pumps 14, a pilot pump 15, a control valve 17, operation devices 26, discharge pressure sensors 28, operation sensors 29, a controller 30, and the like.

In FIG. 3, the drive system is configured to be able to circulate the hydraulic oil from the main pumps 14 driven by the engine 11 to the hydraulic oil tank via the center bypass pipelines 40 or the parallel pipelines 42.

The engine 11 is a drive source of the shovel 100. In the present embodiment, the engine 11 is, for example, a diesel engine that operates to maintain a predetermined rotational speed. An output shaft of the engine 11 is coupled to input shafts of the main pumps 14 and the pilot pump 15.

The main pumps 14 are configured to supply hydraulic oil to the control valve 17 via hydraulic oil lines. In the present embodiment, the main pumps 14 are swash plate type variable displacement hydraulic pumps.

The regulators 13 are configured to be able to control the discharge amount of the main pumps 14. In the present embodiment, the regulators 13 control the discharge amount of the main pumps 14 by adjusting the swash plate tilt angle of the main pumps 14 in response to a control command from the controller 30.

The pilot pump 15 is configured to be able to supply hydraulic oil to a hydraulic control device including the operation device 26 via pilot lines. In the present embodiment, the pilot pump 15 is a fixed displacement hydraulic pump.

The control valve 17 is hydraulic control devices that control the movement of the shovel 100. In the present embodiment, the control valve 17 includes control valves 171 to 176. The control valve 175 includes a control valve 175L and a control valve 175R, and the control valve 176 includes a control valve 176L and a control valve 176R. The control valve 17 is configured to selectively supply the hydraulic oil discharged by the main pump 14 to one or a plurality of hydraulic actuators through the control valves 171 to 176. The control valves 171 to 176 control, for example, the flow rate of the hydraulic oil flowing from the main pump 14 to the hydraulic actuator and the flow rate of the hydraulic oil flowing from the hydraulic actuator to the hydraulic oil tank. The hydraulic actuators include the boom cylinder 7, the arm cylinder 8, the bucket cylinder 9, the left traveling hydraulic motor 2M L, the right traveling hydraulic motor 2M R, and the turning hydraulic motor 2A.

The operation devices 26 are devices used by an operator to operate the actuators. The operation devices 26 include, for example, an operation lever and an operation pedal. The actuators include at least one of hydraulic actuators and electric actuators. In the present embodiment, the operation devices 26 are configured to operate a pilot pressure type control valve drive system. The pilot pressure type control valve drive system is configured such that the hydraulic oil discharged by the pilot pump 15 can be supplied to the pilot ports of the corresponding control valves in the control valve 17 via the pilot lines. The pressure (pilot pressure) of the hydraulic oil supplied to each of the pilot ports is a pressure corresponding to the operation direction and the operation amount of the operation device 26 corresponding to each of the hydraulic actuators. However, the control valve drive system may be an electrically controlled system instead of the pilot pressure system as described above. In this case, the control valves in the control valve 17 may be an electromagnetic solenoid type spool valve.

The discharge pressure sensors 28 are configured to be able to detect the discharge pressure of the main pumps 14. In the present embodiment, the discharge pressure sensors 28 output the detected value to the controller 30.

The operation sensors 29 are configured to be able to detect contents of an operation of the operation devices 26 by the operator. In the present embodiment, the operation sensors 29 electrically detect an operation direction and an operation amount of the operation device 26 corresponding to each of the actuators, and output the detected values to the controller 30.

The main pumps 14 include a left main pump 14L and a right main pump 14R. The left main pump 14L circulates the hydraulic oil to the hydraulic oil tank via a left center bypass pipeline 40L or a left parallel pipeline 42L, and the right main pump 14R circulates the hydraulic oil to the hydraulic oil tank via a right center bypass pipeline 40R or a right parallel pipeline 42R.

The left center bypass pipeline 40L is a hydraulic oil line passing through the control valves 171, 173, 175L, and 176L disposed in the control valve 17. The right center bypass pipeline 40R is a hydraulic oil line passing through the control valves 172, 174, 175R, and 176R disposed in the control valve 17.

The control valve 171 is a spool valve that switches the flow of the hydraulic oil in order to supply the hydraulic oil discharged by the left main pump 14L to the left traveling hydraulic motor 2ML and discharge the hydraulic oil discharged by the left traveling hydraulic motor 2ML to the hydraulic oil tank.

The control valve 172 is a spool valve that switches the flow of the hydraulic oil in order to supply the hydraulic oil discharged by the right main pump 14R to the right traveling hydraulic motor 2MR and discharge the hydraulic oil discharged by the right traveling hydraulic motor 2MR to the hydraulic oil tank.

The control valve 173 is a spool valve that switches the flow of the hydraulic oil in order to supply the hydraulic oil discharged by the left main pump 14L to the turning hydraulic motor 2A and discharge the hydraulic oil discharged by the turning hydraulic motor 2A to the hydraulic oil tank.

The control valve 174 is a spool valve that switches the flow of the hydraulic oil in order to supply the hydraulic oil discharged by the right main pump 14R to the bucket cylinder 9 and discharge the hydraulic oil in the bucket cylinder 9 to the hydraulic oil tank.

The control valve 175L is a spool valve that switches the flow of the hydraulic oil in order to supply the hydraulic oil discharged by the left main pump 14L to the boom cylinder 7. The control valve 175R is a spool that switches the flow of the hydraulic oil in order to supply the hydraulic oil discharged by the right main pump 14R to the boom cylinder 7 and discharge the hydraulic oil in the boom cylinder 7 to the hydraulic oil tank.

The control valve 176L is a spool valve that switches the flow of the hydraulic oil in order to supply the hydraulic oil discharged by the left main pump 14L to the arm cylinder 8 and discharge the hydraulic oil in the arm cylinder 8 to the hydraulic oil tank.

The control valve 176R is a spool valve that switches the flow of the hydraulic oil in order to supply the hydraulic oil discharged by the right main pump 14R to the arm cylinder 8 and discharge the hydraulic oil in the arm cylinder 8 to the hydraulic oil tank.

The left parallel pipeline 42L is a hydraulic oil line parallel to the left center bypass pipeline 40L. The left parallel pipeline 42L can supply hydraulic oil to further downstream control valves when the flow of hydraulic oil through the left center bypass pipeline 40L is restricted or blocked by any of the control valves 171, 173, and 175L. The right parallel pipeline 42R is a hydraulic oil line parallel to the right center bypass pipeline 40R. The right parallel pipeline 42R can supply hydraulic oil to further downstream control valves when the flow of hydraulic oil through the right center bypass pipeline 40R is restricted or blocked by any of the control valves 172, 174, and 175R.

The regulators 13 include a left regulator 13L and a right regulator 13R. The left regulator 13L controls the discharge amount of the left main pump 14L by adjusting the swash plate tilt angle of the left main pump 14L in accordance with the discharge pressure of the left main pump 14L. For example, the left regulator 13L reduces the discharge amount by adjusting the swash plate tilt angle of the left main pump 14L in accordance with an increase in the discharge pressure of the left main pump 14L. The same applies to the right regulator 13R. This is to prevent the absorption horsepower of the main pump 14 represented by the product of the discharge pressure and the discharge amount from exceeding the output horsepower of the engine 11.

The operation devices 26 include a left operation lever 26L, a right operation lever 26R, and a traveling lever 26D. The traveling lever 26D includes a left traveling lever 26DL and a right traveling lever 26DR.

The left operation lever 26L is used for the turning operation and the operation of the arm 5. When the left operation lever 26L is operated in the front-rear direction, the control pressure corresponding to the lever operation amount is introduced into the pilot port of the control valves 176 by using the hydraulic oil discharged by the pilot pump 15. When the left operation lever 26L is operated in the left-right direction, the control pressure corresponding to the lever operation amount is introduced into the pilot port of the control valve 173 by using the hydraulic oil discharged from the pilot pump 15.

To be more specific, when the left operation lever 26L is operated in the arm closing direction, the operating oil is introduced into the right pilot port of the control valve 176L and the operating oil is introduced into the left pilot port of the control valve 176R. When the left operation lever 26L is operated in the arm opening direction, the operating oil is introduced into the left pilot port of the control valve 176L and the operating oil is introduced into the right pilot port of the control valve 176R. When the left operation lever 26L is operated in the left turning direction, the hydraulic oil is introduced into the left pilot port of the control valve 173, and when the left operation lever 26L is operated in the right turning direction, the hydraulic oil is introduced into the right pilot port of the control valve 173.

The right operation lever 26R is used to operate the boom 4 and the bucket 6. When the right operation lever 26R is operated in the front-rear direction, the control pressure corresponding to the lever operation amount is introduced into the pilot ports of the control valves 175 using the hydraulic oil discharged by the pilot pump 15. When the right operation lever 26R is operated in the left-right direction, the control pressure corresponding to the lever operation amount is introduced into the pilot port of the control valve 174 by using the hydraulic oil discharged from the pilot pump 15.

To be specific, when the right operation lever 26R is operated in the boom lowering direction, the hydraulic oil is introduced into the left pilot port of the control valve 175R. When the right operation lever 26R is operated in the boom raising direction, the hydraulic oil is introduced into the right pilot port of the control valve 175L and the hydraulic oil is introduced into the left pilot port of the control valve 175R. Further, when the right operation lever 26R is operated in the bucket closing direction, the hydraulic oil is introduced into the right pilot port of the control valve 174, and when the right operation lever 26R is operated in the bucket opening direction, the hydraulic oil is introduced into the left pilot port of the control valve 174.

The traveling lever 26D is used to operate the crawler 1C. Specifically, the left traveling lever 26DL is used to operate the left crawler 1CL. The traveling lever 26D may be configured to be interlocked with the left traveling pedal. When the left traveling lever 26DL is operated in the front-rear direction, the control pressure corresponding to the lever operation amount is introduced into the pilot port of the control valve 171 using the hydraulic oil discharged by the pilot pump 15. The right traveling lever 26DR is used to operate the right crawler 1CR. The right traveling lever 26DR may be configured to be interlocked with the right traveling pedal. When the right traveling lever 26DR is operated in the front-rear direction, the control pressure corresponding to the lever operation amount is introduced into the pilot port of the control valve 172 using the hydraulic oil discharged by the pilot pump 15. Hereinafter, the left traveling lever 26DL, the right traveling lever 26DR, the left traveling pedal, and the right traveling pedal may be collectively referred to as a "traveling operation device". Furthermore, the left traveling pedal and the right traveling pedal may be collectively referred to as "traveling pedals".

The discharge pressure sensors 28 include a discharge pressure sensor 28L and a discharge pressure sensor 28R. The discharge pressure sensor 28L detects the discharge pressure of the left main pump 14L and outputs the detected value to the controller 30. The same applies to the discharge pressure sensor 28R.

The operation sensors 29 include operation sensors 29LA, 29LB, 29RA, 29RB, 29DL, and 29DR. The operation sensor 29LA electrically detects the content of an operation performed by an operator on the left operation lever 26L in the front-rear direction and outputs the detected value to the controller 30. The content of the operation is, for example, a lever operation direction, a lever operation amount (lever operation angle), or the like.

Similarly, the operation sensor 29LB electrically detects the content of an operation performed by the operator on the left operation lever 26L in the left-right direction, and outputs the detected value to the controller 30. The operation sensor 29RA electrically detects the content of an operation performed by the operator on the right operation lever 26R in the front-rear direction, and outputs the detected value to the controller 30. The operation sensor 29RB electrically detects the content of an operation performed by the operator on the right operation lever 26R in the left-right direction, and outputs the detected value to the controller 30. The operation sensor 29DL electrically detects the content of an operation performed by the operator on the left traveling lever 26DL in the front-rear direction, and outputs the detected value to the controller 30. The operation sensor 29DR electrically detects the content of an operation performed by the operator on the right traveling lever 26DR in the front-rear direction, and outputs the detected value to the controller 30.

The controller 30 receives the output of the operation sensor 29, outputs a control command to the regulator 13 as necessary, and changes the discharge amount of the main pump 14. Further, the controller 30 receives an output of a control pressure sensor 19 provided upstream of a throttle 18, outputs a control command to the regulator 13 as necessary, and changes the discharge amount of the main pump 14. The throttle 18 includes a left throttle 18L and a right throttle 18R, and the control pressure sensor 19 includes a left control pressure sensor 19L and a right control pressure sensor 19R.

In the left center bypass pipeline 40L, the left throttle 18L is disposed between the most downstream control valve 176L and the hydraulic oil tank. Therefore, the flow of the hydraulic oil discharged by the left main pump 14L is limited by the left throttle 18L. The left throttle 18L generates a control pressure for controlling the left regulator 13L. The left control pressure sensor 19L is a sensor for detecting the control pressure, and outputs the detected value to the controller 30. The controller 30 controls the discharge amount of the left main pump 14L by adjusting the swash plate tilt angle of the left main pump 14L in accordance with the control pressure. The controller 30 decreases the discharge amount of the left main pump 14L as the control pressure increases, and increases the discharge amount of the left main pump 14L as the control pressure decreases. The discharge amount of the right main pump 14R is also controlled in the same manner.

To be more specific, as illustrated in FIG. 3, in the case of a standby state in which none of the hydraulic actuators in the shovel 100 is operated, the hydraulic oil discharged from the left main pump 14L passes through the left center bypass pipeline 40L and reaches the left throttle 18L. The flow of the hydraulic oil discharged by the left main pump 14L increases the control pressure generated upstream of the left throttle 18L. As a result, the controller 30 reduces the discharge amount of the left main pump 14L to the allowable minimum discharge amount, and suppresses the pressure loss (pumping loss) when the discharged hydraulic oil passes through the left center bypass pipeline 40L. On the other hand, when any of the hydraulic actuators is operated, the hydraulic oil discharged by the left main pump 14L flows into the hydraulic actuators to be operated via the control valves corresponding to the hydraulic actuators to be operated. Then, the flow of the hydraulic oil discharged by the left main pump 14L reduces or eliminates the amount of the hydraulic oil reaching the left throttle 18L, thereby reducing the control pressure generated upstream of the left throttle 18L. As a result, the controller 30 increases the discharge amount of the left main pump 14L to circulate a sufficient amount of hydraulic oil to the hydraulic actuators to be operated, thereby ensuring the driving of the hydraulic actuators to be operated. The controller 30 controls the discharge amount of the right main pump 14R in the same manner.

With the above-described configuration, the drive system of FIG. 3 can suppress wasteful energy consumption in the main pump 14 in the standby state. The wasteful energy consumption includes a pumping loss generated in the center bypass pipeline 40 by the hydraulic oil discharged by the main pump 14. Further, in the drive system of FIG. 3, when the hydraulic actuator is operated, a necessary and sufficient amount of hydraulic oil can be reliably supplied from the main pump 14 to the hydraulic actuators to be operated.

Figure 4A:
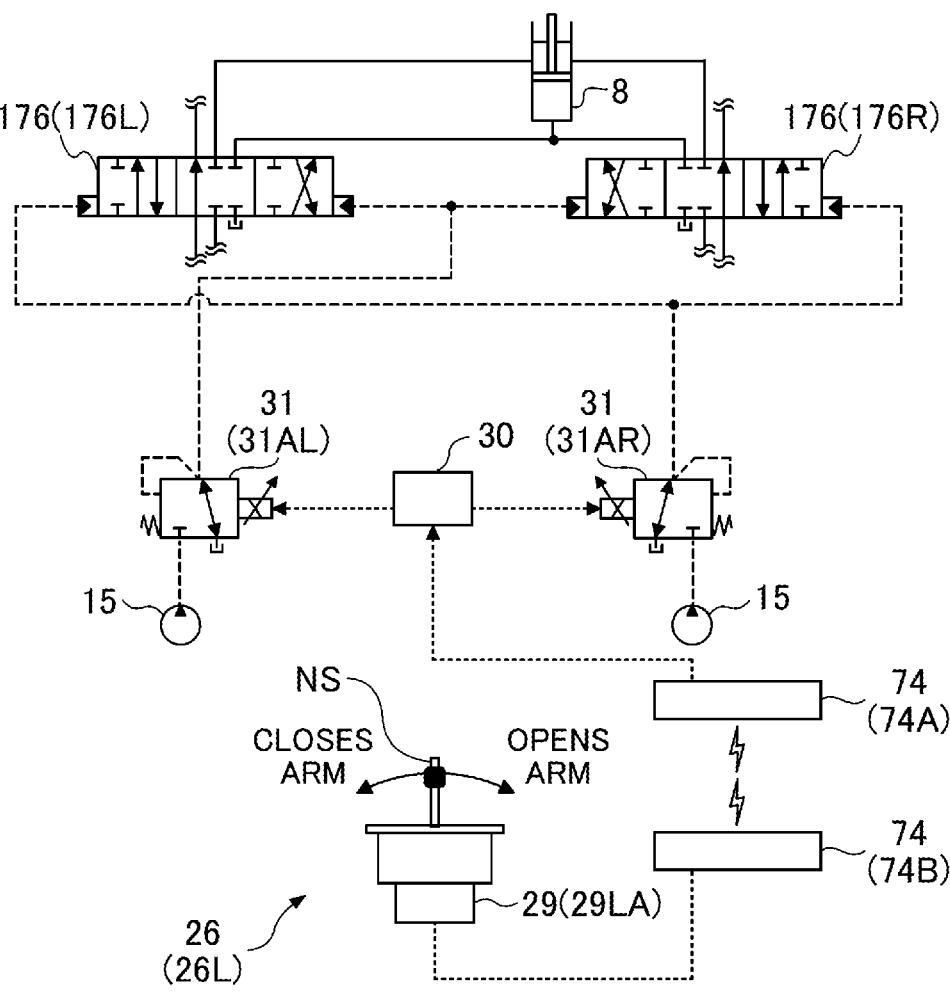
FIG. 4A is a view of a portion of a drive system for operation of an arm cylinder.
Figure 4B:
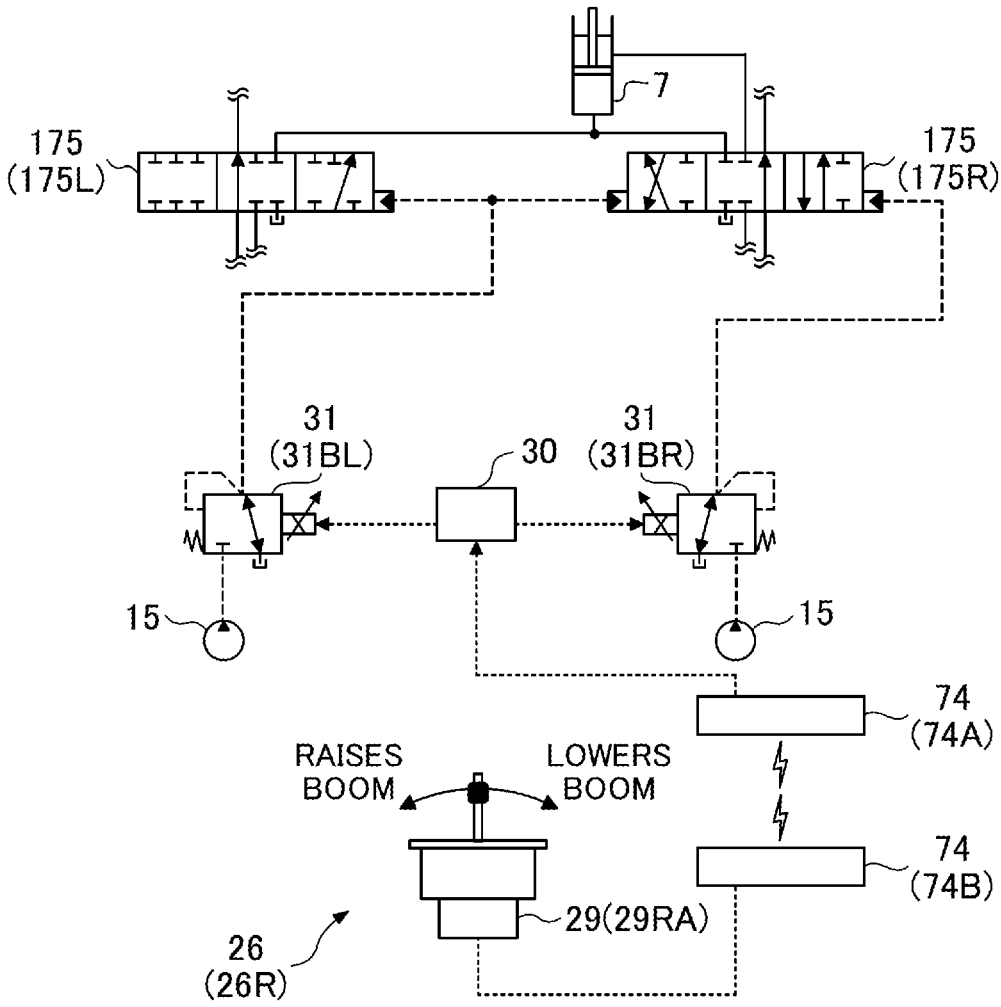
FIG. 4B is a view of a portion of the drive system for operation of a boom cylinder.
Figure 4C:
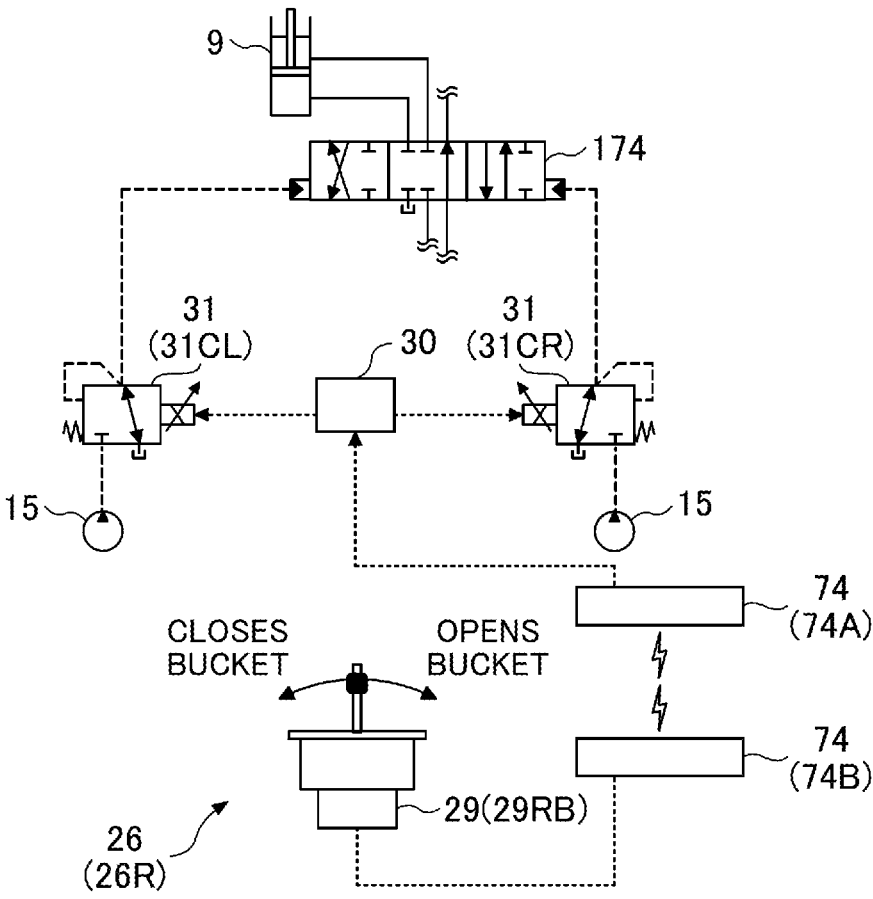
FIG. 4C is a view of a portion of the drive system for operation of a bucket cylinder.
Figure 4D:
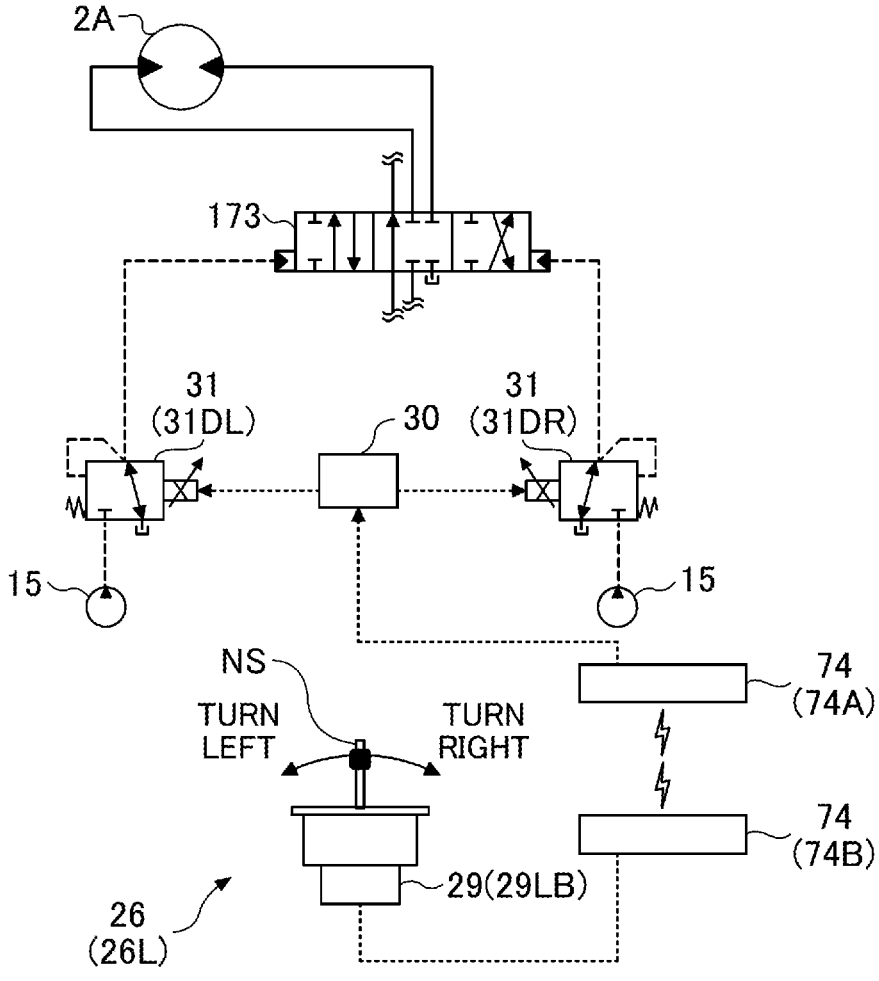
FIG. 4D is a view of a portion of the drive system for operation of a turning hydraulic motor.

Next, a configuration in which the controller 30 causes the actuators to operate by the machine control function will be described with reference to FIGS. 4A to 4D, FIG. 5A, and FIG. 5B. FIGS. 4A to 4D, FIG. 5A, and FIG. 5B are views of a portion of the drive system. In particular, FIG. 4A is a view of a portion of the drive system for operation of the arm cylinder 8, and FIG. 4B is a view of a portion of the drive system for operation of the boom cylinder 7. FIG. 4C is a view of a portion of the drive system for operation of the bucket cylinder 9, and FIG. 4D is a view of a portion of the drive system for operation of the turning hydraulic motor 2A. FIG. is a view of a portion of the drive system for operation of the left traveling hydraulic motor 2M L, and FIG. 5B is a view of a portion of the drive system for operation of the right traveling hydraulic motor 2M R.

As illustrated in FIGS. 4A to 4D, FIG. 5A, and FIG. 5B, the drive system includes proportional valves 31. The proportional valves 31 include proportional valves 31AL to 31FL and 31AR to 31FR.

The proportional valves 31 function as control valves for machine control. The proportional valves 31 are disposed in pipelines connecting the pilot pump 15 and the control valves 171 to 176, and are configured to be able to change a flow path area of the pipelines. In the present embodiment, the proportional valves 31 operate in response to a control command output from the controller 30. Therefore, the controller 30 can supply the hydraulic oil discharged by the pilot pump 15 to the pilot port of the corresponding control valve in the control valve 17 via the proportional valves 31 regardless of the operation of the operation device 26 by the operator.

With this configuration, even when a specific operation device 26 is not operated, the controller 30 can operate the hydraulic actuator corresponding to the specific operation device 26. In addition, even when a specific operation device 26 is operated, the controller 30 can forcibly stop the operation of the hydraulic actuator corresponding to the specific operation device 26.

For example, as illustrated in FIG. 4A, the left operation lever 26L is used to operate the arm 5. In particular, the left operation lever 26L uses the hydraulic oil discharged by the pilot pump 15 to apply the pilot pressure corresponding to the operation in the front-rear direction to the pilot port of the control valve 176. To be more specific, when the left operation lever 26L is operated in the arm closing direction (rearward direction), the left operation lever 26L causes the pilot pressure corresponding to the operation amount to act on the right pilot port of the control valve 176L and the left pilot port of the control valve 176R. When the left operation lever 26L is operated in the arm opening direction (forward direction), the left operation lever 26L causes the pilot pressure corresponding to the operation amount to the left pilot port of the control valve 176L and the right pilot port of the control valve 176R.

A switch NS is provided on the left operation lever 26L. In the present embodiment, the switch NS is a push button switch. The operator can operate the left operation lever 26L while pressing the switch NS. The switch NS may be provided on the right operation lever 26R or may be provided at another position in the remote control room RC.

The operation sensor 29LA electrically detects the content of an operation performed by the operator on the left operation lever 26L in the front-rear direction and outputs the detected value to the controller 30.

The proportional valve 31AL operates in response to a current command output from the controller 30. The proportional valve 31AL adjusts the pilot pressure of the hydraulic oil introduced from the pilot pump 15 to the right pilot port of the control valve 176L and the left pilot port of the control valve 176R via the proportional valve 31AL. The proportional valve 31AR operates in response to a current command output from the controller 30. The proportional valve 31AR adjusts the pilot pressure of the hydraulic oil introduced from the pilot pump 15 to the left pilot port of the control valve 176L and the right pilot port of the control valve 176R via the proportional valve 31AR. The proportional valves 31AL and 31AR can adjust the pilot pressure so that the control valves 176L and 176R can be stopped at arbitrary positions.

With this configuration, the controller 30 can supply the hydraulic oil discharged from the pilot pump 15 to the right pilot port of the control valve 176L and the left pilot port of the control valve 176R via the proportional valve 31AL regardless of the arm closing operation by the operator. That is, the arm 5 can be closed. Further, the controller 30 can supply the hydraulic oil discharged from the pilot pump 15 to the left pilot port of the control valve 176L and the right pilot port of the control valve 176R via the proportional valve 31AR regardless of the arm opening operation by the operator. That is, the arm 5 can be opened.

Further, even when the operator performs the arm closing operation, the controller 30 can forcibly stop the closing operation of the arm 5 by reducing the pilot pressure acting on the pilot port on the closing side of the control valve 176

(the left pilot port of the control valve 176L and the right pilot port of the control valve 176R) as necessary. The same applies to a case where the opening operation of the arm 5 is forcibly stopped when the operator performs the arm opening operation.

Alternatively, even when the operator performs the arm closing operation, the controller 30 may forcibly stop the closing operation of the arm 5 by controlling the proportional valve 31AR as necessary to increase the pilot pressures acting on the pilot ports (the right pilot port of the control valve 176L and the left pilot port of the control valve 176R) on the opening side of the control valve 176 on the opposite side of the pilot port on the closing side of the control valve 176 and forcibly returning the control valve 176 to the neutral position. The same applies to a case where the opening operation of the arm 5 is forcibly stopped when the operator performs the arm opening operation.

Although description with reference to the following FIGS. 4B to 4D, FIG. 5A, and FIG. 5B is omitted, the same applies to a case where the operation of the boom 4 is forcibly stopped when the operator performs the boom raising operation or the boom lowering operation, a case where the operation of the bucket 6 is forcibly stopped when the operator performs the bucket closing operation or the bucket opening operation, and a case where the turning operation of the upper turning body 3 is forcibly stopped when the operator performs the turning operation. The same applies to a case where the traveling operation of the lower traveling body 1 is forcibly stopped when the traveling operation is performed by the operator.

As illustrated in FIG. 4B, the right operation lever 26R is used to operate the boom 4. To be more specific, the right operation lever 26R applies a pilot pressure corresponding to the operation in the front-rear direction to the pilot port of the control valve 175 using the hydraulic oil discharged by the pilot pump 15. To be more specific, when the right operation lever 26R is operated in the boom raising direction (rearward direction), the pilot pressure corresponding to the operation amount is applied to the right pilot port of the control valve 175L and the left pilot port of the control valve 175R. When the right operation lever 26R is operated in the boom lowering direction (forward direction), the pilot pressure corresponding to the operation amount is applied to the right pilot port of the control valve 175R.

The operation sensor 29RA electrically detects the content of an operation performed by the operator on the right operation lever 26R in the front-rear direction, and outputs the detected value to the controller 30.

The proportional valve 31BL operates in response to a current command output from the controller 30. The proportional valve 31BL adjusts the pilot pressure of the hydraulic oil introduced from the pilot pump 15 to the right pilot port of the control valve 175L and the left pilot port of the control valve 175R via the proportional valve 31BL. The proportional valve 31BR operates in response to a current command output from the controller 30. The proportional valve 31BR adjusts the pilot pressure of the hydraulic oil introduced from the pilot pump 15 to the left pilot port of the control valve 175L and the right pilot port of the control valve 175R via the proportional valve 31BR. The proportional valves 31BL and 31BR can adjust the pilot pressure so that the control valves 175L and 175R can be stopped at arbitrary positions.

With this configuration, the controller 30 can supply the hydraulic oil discharged from the pilot pump 15 to the right pilot port of the control valve 175L and the left pilot port of the control valve 175R via the proportional valve 31BL regardless of the boom raising operation by the operator. That is, the boom 4 can be raised. Further, the controller 30 can supply the hydraulic oil discharged from the pilot pump 15 to the right pilot port of the control valve 175R via the proportional valve 31BR regardless of the boom lowering operation by the operator. In other words, the boom 4 can be lowered.

As illustrated in FIG. 4C, the right operation lever 26R is also used to operate the bucket 6. To be specific, the right operation lever 26R uses the hydraulic oil discharged by the pilot pump 15 to apply the pilot pressure corresponding to the operation in the left-right direction to the pilot port of the control valve 174. To be more specific, when the right operation lever 26R is operated in the bucket closing direction (left direction), the right operation lever 26R applies a pilot pressure corresponding to the operation amount to the left pilot port of the control valve 174. In addition, when the right operation lever 26R is operated in the bucket opening direction (right direction), the pilot pressure corresponding to the operation amount is applied to the right pilot port of the control valve 174.

The operation sensor 29RB electrically detects the content of an operation performed by the operator on the right operation lever 26R in the left-right direction, and outputs the detected value to the controller 30.

The proportional valve 31CL operates in response to a current command output from the controller 30. The proportional valve 31CL adjusts the pilot pressure of the hydraulic oil introduced from the pilot pump 15 to the left pilot port of the control valve 174 via the proportional valve 31CL. The proportional valve 31CR operates in response to a current command output from the controller 30. The proportional valve 31CR adjusts the pilot pressure of the hydraulic oil introduced from the pilot pump 15 to the right pilot port of the control valve 174 via the proportional valve 31CR. The proportional valves 31CL and 31CR can adjust the pilot pressure so that the control valve 174 can be stopped at an arbitrary position.

With this configuration, the controller 30 can supply the hydraulic oil discharged from the pilot pump 15 to the left pilot port of the control valve 174 via the proportional valve 31CL regardless of the bucket closing operation by the operator. That is, the bucket 6 can be closed. Further, the controller 30 can supply the hydraulic oil discharged from the pilot pump 15 to the right pilot port of the control valve 174 via the proportional valve 31CR regardless of the bucket opening operation by the operator. That is, the bucket 6 can be opened.

As illustrated in FIG. 4D, the left operation lever 26L is also used to operate the turning mechanism 2. To be specific, the left operation lever 26L uses the hydraulic oil discharged by the pilot pump 15 to apply the pilot pressure corresponding to the operation in the left-right direction to the pilot port of the control valve 173. To be more specific, when the left operation lever 26L is operated in the left turning direction (left direction), the left operation lever 26L causes the pilot pressure corresponding to the operation amount to act on the left pilot port of the control valve 173. When the left operation lever 26L is operated in the right turning direction (right direction), the pilot pressure corresponding to the operation amount is applied to the right pilot port of the control valve 173.

The operation sensor 29LB electrically detects the content of an operation performed by the operator on the left operation lever 26L in the left-right direction and outputs the detected value to the controller 30.

The proportional valve 31DL operates in response to a current command output from the controller 30. The proportional valve 31DL adjusts the pilot pressure of the hydraulic oil introduced from the pilot pump 15 to the left pilot port of the control valve 173 via the proportional valve 31DL. The proportional valve 31DR operates in response to a current command output from the controller 30. The proportional valve 31DR adjusts the pilot pressure of the hydraulic oil introduced from the pilot pump 15 to the right pilot port of the control valve 173 via the proportional valve 31DR. The proportional valves 31DL and 31DR can adjust the pilot pressure so that the control valve 173 can be stopped at an arbitrary position.

With this configuration, the controller 30 can supply the hydraulic oil discharged from the pilot pump 15 to the left pilot port of the control valve 173 via the proportional valve 31DL regardless of the left turning operation by the operator. That is, the turning mechanism 2 can be turned to the left. In addition, the controller 30 can supply the hydraulic oil discharged from the pilot pump 15 to the right pilot port of the control valve 173 via the proportional valve 31DR regardless of the right turning operation by the operator. That is, the turning mechanism 2 can be turned to the right.

In addition, the controller 30 may control at least one of the proportional valves 31DL and 31DR by the current command to automatically rotate or brake the turning hydraulic motor 2A, which is an example of an actuator, in order to cause the upper turning body 3 to face the target construction surface.

For example, a state in which the upper turning body 3 of the shovel 100 directly faces the target construction surface is a state in which the distal end portion of the attachment (for example, the toe, the back surface, or the like of the bucket 6 as the construction site) can be moved along the inclination direction of the target construction surface (for example, the ascending slope) in accordance with the operation of the attachment. Specifically, the state in which the upper turning body 3 of the shovel 100 directly faces the target construction surface is a state in which the attachment operating surface (virtual plane including the center line of the attachment) perpendicular to the turning plane (virtual plane perpendicular to the turning axis) of the shovel 100 includes the normal to the target construction surface (in other words, a state along the normal to the target construction surface).

When the attachment operating surface of the shovel 100 does not include the normal to the target construction surface, that is, when the upper turning body 3 does not directly face the target construction surface, the shovel 100 cannot move the distal end portion of the attachment in the inclination direction of the target construction surface. Therefore, as a result, the shovel 100 cannot appropriately form the target construction surface. In this situation, the controller 30 automatically rotates the turning hydraulic motor 2A so that the upper turning body 3 can face the target construction surface. Therefore, the shovel 100 can appropriately form the target construction surface.

In the facing control as described above, for example, when a vertical distance between the left end of the claw tip of the bucket 6 and the target construction surface (hereinafter referred to as a "left end vertical distance") and a vertical distance between the right end of the claw tip of the bucket 6 and the target construction surface (hereinafter referred to as a "right end vertical distance") are equal, the controller 30 determines that the shovel 100 faces the target construction surface. Alternatively, when the left end vertical distance and the right end vertical distance do not become equal (i.e., when the difference between the left end vertical distance and the right end vertical distance does not becomes zero), but when the difference becomes less than or equal to a predetermined value, the controller 30 may determine that the shovel 100 faces the target construction surface. Thereafter, when the difference becomes equal to or less than a predetermined value or becomes zero, the controller 30 decelerates and stops the turning hydraulic motor 2A by braking control of the turning hydraulic motor 2A.

In the above-described example, the case of the facing control related to the target construction surface is explained, but the execution of the facing control is not limited to the case related to the target construction surface. For example, the facing control may be executed during a scooping operation for loading temporarily placed earth and sand onto a dump truck. Specifically, the controller 30 sets a target excavation trajectory which is a trajectory to be followed by the claw tip of the bucket 6 in order to take a desired volume (target excavation volume) of earth and sand into the bucket 6 in one excavation operation. Then, the controller 30 may cause the upper turning body 3 to face a virtual plane perpendicular to the attachment operation surface when the claw tip of the bucket 6 is moved along the target excavation trajectory. In this case, the target excavation trajectory is changed every time the scooping operation is performed. Therefore, the shovel 100 causes the upper turning body 3 to face the virtual plane perpendicular to the attachment operation plane when the claw tip of the bucket 6 is moved along the newly set target excavation trajectory after the earth and sand are discharged onto the load-carrying platform of the dump truck.

Figure 5A:
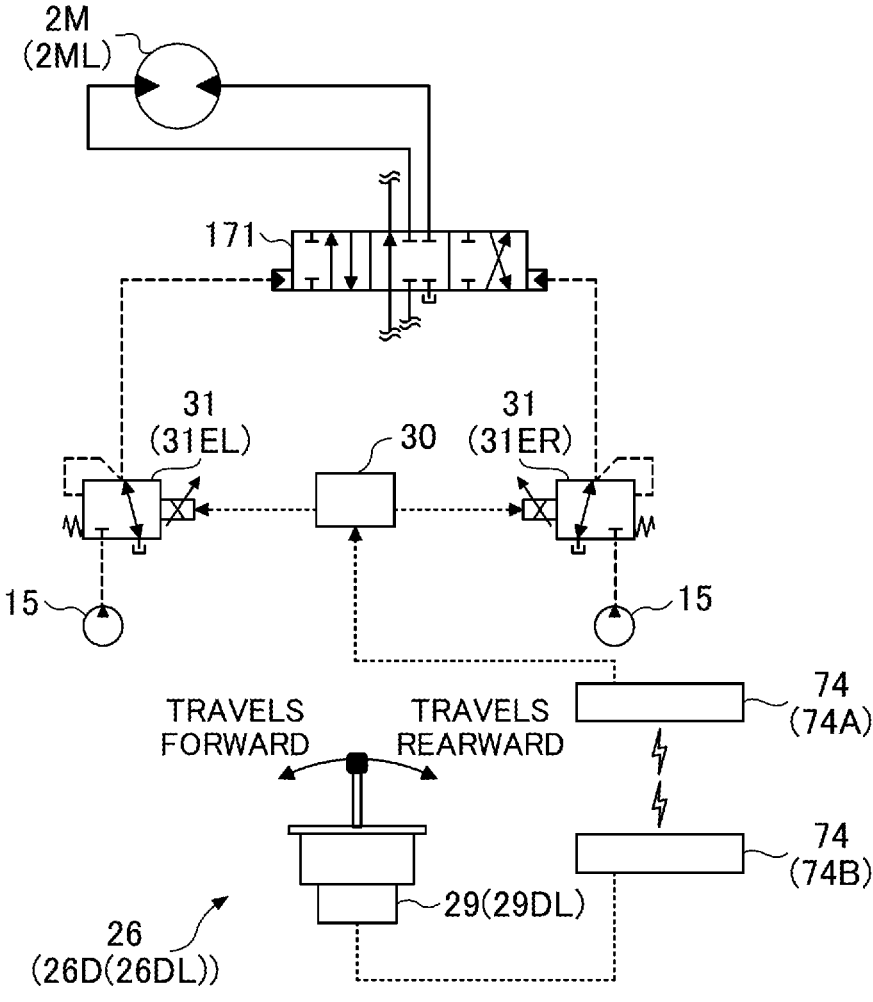
FIG. 5A is a view of a portion of the drive system for operation of a left traveling hydraulic motor.
Figure 5B:
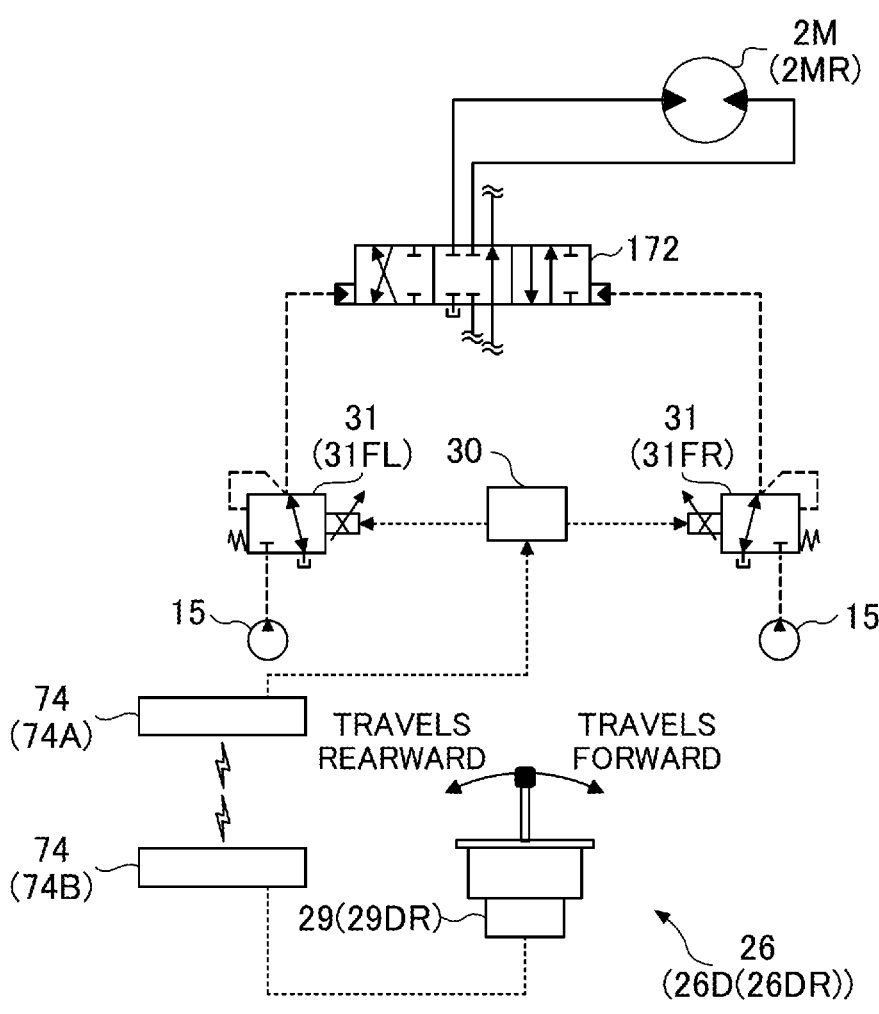
FIG. 5B is a view of a portion of the drive system for operation of a right traveling hydraulic motor.

As illustrated in FIG. 5A, the left traveling lever 26DL is used to operate the left crawler 1CL. To be specific, the left traveling lever 26DL applies a pilot pressure corresponding to an operation in the front-rear direction to the pilot port of the control valve 171 by using the hydraulic oil discharged by the pilot pump 15. To be more specific, when the left traveling lever 26DL is operated in the forward direction (front direction), the left traveling lever 26DL applies a pilot pressure corresponding to the operation amount to the left pilot port of the control valve 171. When the left traveling lever 26DL is operated in the reverse direction (rearward direction), the left traveling lever 26DL applies a pilot pressure corresponding to the operation amount to the right pilot port of the control valve 171.

The operation sensor 29DL electrically detects the content of an operation performed by the operator on the left traveling lever 26DL in the front-rear direction, and outputs the detected value to the controller 30.

The proportional valve 31EL operates in response to a current command output from the controller 30. The proportional valve 31EL adjusts the pilot pressure of the hydraulic oil introduced from the pilot pump 15 to the left pilot port of the control valve 171 via the proportional valve 31EL. The proportional valve 31ER operates in response to a current command output from the controller 30. The proportional valve 31ER adjusts the pilot pressure of the hydraulic oil introduced from the pilot pump 15 to the right pilot port of the control valve 171 via the proportional valve 31ER. The proportional valves 31EL and 31ER can adjust the pilot pressure so that the control valve 171 can be stopped at an arbitrary position.

With this configuration, the controller 30 can supply the hydraulic oil discharged from the pilot pump 15 to the left pilot port of the control valve 171 via the proportional valve 31EL regardless of the forward left movement operation by the operator. That is, the left crawler 1CL can be moved forward. In addition, the controller 30 can supply the hydraulic oil discharged from the pilot pump 15 to the right pilot port of the control valve 171 via the proportional valve 31ER regardless of the backward left movement operation by the operator. That is, the left crawler 1CL can be caused to move backward.

As illustrated in FIG. 5B, the right traveling lever 26DR is used to operate the right crawler 1CR. To be specific, the right traveling lever 26DR uses the hydraulic oil discharged by the pilot pump 15 to apply the pilot pressure corresponding to the operation in the front-rear direction to the pilot port of the control valve 172. To be more specific, when the right traveling lever 26DR is operated in the forward direction (front direction), the right traveling lever 26DR applies a pilot pressure corresponding to the operation amount to the right pilot port of the control valve 172. When the right traveling lever 26DR is operated in the reverse direction (rear direction), the pilot pressure corresponding to the operation amount is applied to the left pilot port of the control valve 172.

The operation sensor 29DR electrically detects the content of an operation performed by the operator on the right traveling lever 26DR in the front-rear direction, and outputs the detected value to the controller 30.

The proportional valve 31FL operates in response to a current command output from the controller 30. The proportional valve 31FL adjusts the pilot pressure of the hydraulic oil introduced from the pilot pump 15 to the left pilot port of the control valve 172 via the proportional valve 31FL. The proportional valve 31FR operates in response to a current command output from the controller 30. The proportional valve 31FR adjusts the pilot pressure of the hydraulic oil introduced from the pilot pump 15 to the right pilot port of the control valve 172 via the proportional valve 31FR. The proportional valves 31FL and 31FR can adjust the pilot pressure so that the control valve 172 can be stopped at an arbitrary position.

With this configuration, the controller 30 can supply the hydraulic oil discharged from the pilot pump 15 to the right pilot port of the control valve 172 via the proportional valve 31FL, regardless of the forward right movement operation by the operator. That is, the right crawler 1CR can be moved forward. Further, the controller 30 can supply the hydraulic oil discharged from the pilot pump 15 to the left pilot port of the control valve 172 via the proportional valve 31FR, regardless of the backward right movement operation by the operator. That is, the right crawler 1CR can be caused to move backward.

Figure 6:
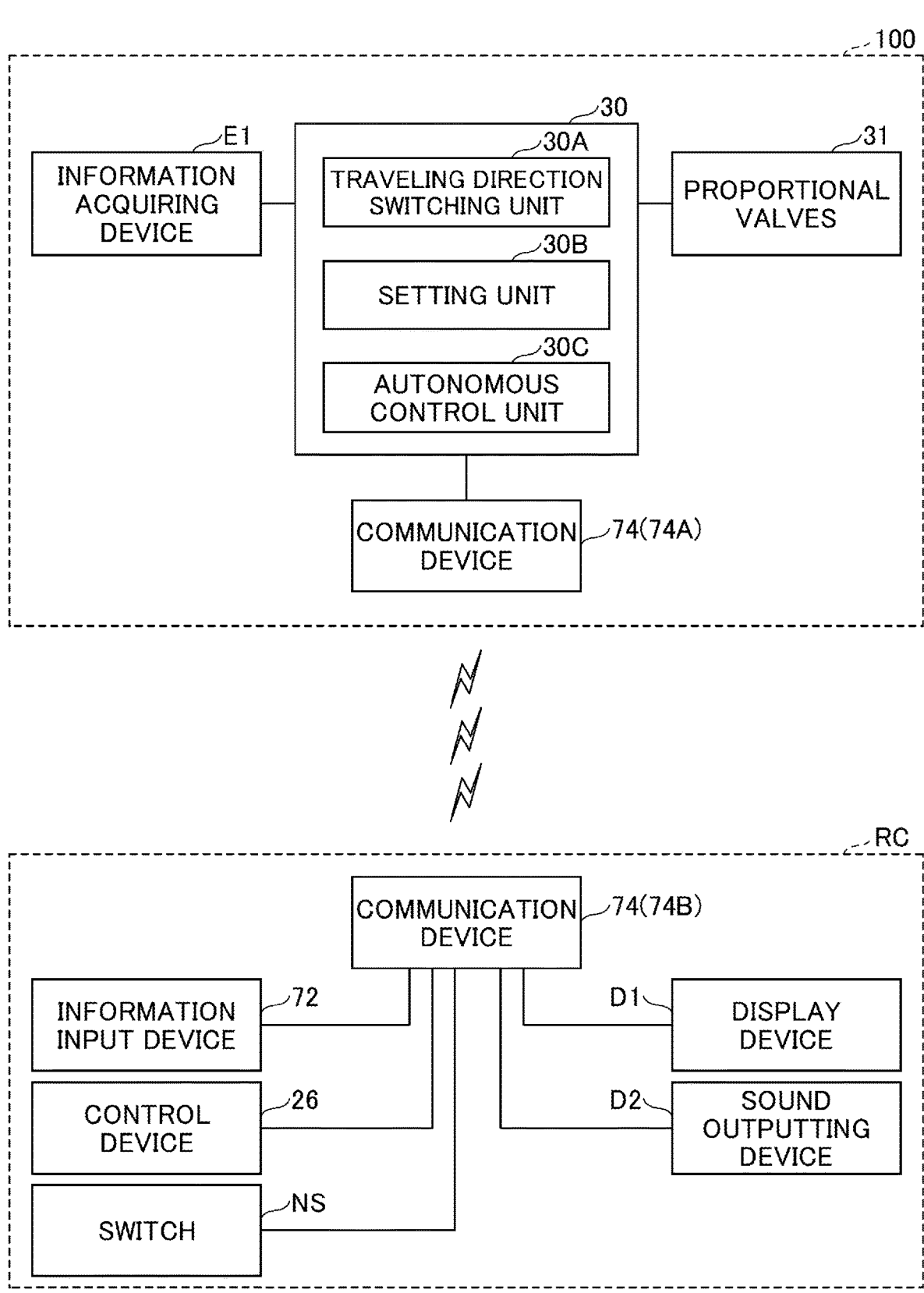
FIG. 6 is a functional block diagram of a controller.

Next, the function of the controller 30 will be described with reference to FIG. 6. FIG. 6 is a functional block diagram of the controller 30. In the example of FIG. 6, the controller 30 is configured to be able to receive a signal outputted by at least one of information acquiring device E1, switch NS, and the like, execute various calculations, and output a control command to at least one of the proportional valves 31, the display device D1, the sound outputting device D2, and the like.

The information acquiring device E1 detects information on the shovel 100. In the present embodiment, the information acquiring device E1 includes at least one of a boom angle sensor S1, an arm angle sensor S2, a bucket angle sensor S3, a machine body inclination sensor S4, a turning angular velocity sensor S5, a boom rod pressure sensor, a boom bottom pressure sensor, an arm rod pressure sensor, an arm bottom pressure sensor, a bucket rod pressure sensor, a bucket bottom pressure sensor, a boom cylinder stroke sensor, an arm cylinder stroke sensor, a bucket cylinder stroke sensor, a discharge pressure sensor 28, an operation sensor 29, a space recognition device 70, a direction detection device 71, an information input device 72, a position measurement device 73, and a communication device 74. The information acquiring device E1 acquires, for example, at least one of boom angle, arm angle, bucket angle, machine body inclination angle, turning angular velocity, boom rod pressure, boom bottom pressure, arm rod pressure, arm bottom pressure, bucket rod pressure, bucket bottom pressure, boom stroke amount, arm stroke amount, bucket stroke amount, discharge pressure of the main pump 14, operation amount of the operation device 26, information on an object existing in a three dimensional space around the shovel 100, information on a relative relationship between the direction of the upper turning body 3 and the direction of the lower traveling body 1, information input to the controller 30, and information on a current position as information on the shovel 100. The information acquiring device E1 may acquire information from another machine (a construction machine, a flying object for acquiring site information, or the like).

The controller 30 includes a traveling direction switching unit 30A, a setting unit 30B, and an autonomous control unit 30C as functional elements. Each functional element may be configured by hardware or may be configured by software. The setting unit 30B and the autonomous control unit 30C may be omitted.

The traveling direction switching unit 30A is configured to be able to switch the traveling direction of the shovel 100. In the present embodiment, the traveling direction switching unit 30A is configured to be able to switch the traveling mode of the shovel 100. The traveling mode includes a forward traveling mode and a backward traveling mode.

The following description is applied when the turning angle, which is an angle formed between the longitudinal axis of the lower traveling body 1 and the longitudinal axis of the upper turning body 3 in a top view, is 0 degrees, that is, when the front of the lower traveling body 1 and the front of the upper turning body 3 are aligned with each other. However, it may be applied when the turning angle is equal to or less than a predetermined angle.

The forward traveling mode is a traveling mode in which the lower traveling body 1 is operated such that the front side of the upper turning body 3 is to be positioned forward in the traveling direction. The backward traveling mode is a traveling mode in which the lower traveling body 1 is operated such that the rear side of the upper turning body 3 is to be positioned forward in the traveling direction.

As described above, the traveling direction switching unit 30A is configured to determine the front and rear of the traveling direction in accordance with the direction of the upper turning body 3. Therefore, the controller 30 can perform travel control such that the rear side of the upper turning body 3 is to be positioned forward in the traveling direction.

Specifically, in the forward traveling mode, when the traveling operation device is operated in the first operating direction (forward direction), the lower traveling body 1 operates so that the front of the upper turning body 3 is in front of the traveling direction, and when the traveling operation device is operated in the second operation direction (reverse direction), which is the opposite of the first operating direction, the lower traveling body 1 operates so that the rear side of the upper turning body 3 is to be positioned rearward in the traveling direction. To be more specific, in the forward traveling mode, when the traveling lever 26D is tilted forward (when pushed in a direction away from the operator) or when the front side (claw tip side) of the traveling pedal is stepped on, the shovel 100 moves forward with the front side of the upper turning body 3 being positioned forward in the traveling direction. When the traveling lever 26D is tilted backward (when drawn in a direction closer to the operator) or when the rear side (heel side) of the traveling pedal is stepped on, the shovel 100 moves backward with the rear side of the upper turning body 3 being positioned rearward in the traveling direction.

On the other hand, in the backward traveling mode, when the traveling operation device is operated in the first operation direction (forward traveling direction), the lower traveling body 1 is operated so that the rear side of the upper turning body 3 is to be positioned forward in the traveling direction. When the traveling operation device is operated in the second operation direction (backward traveling direction), the lower traveling body 1 is operated so that the front side of the upper turning body 3 is to be positioned rearward in the traveling direction. To be more specific, in the backward traveling mode, when the traveling lever 26D is tilted forward or when the front side (claw tip side) of the traveling pedal is stepped on, the shovel 100 moves forward with the rear side of the upper turning body 3 being positioned forward in the traveling direction. When the traveling lever 26D is tilted backward or when the rear side (heel side) of the traveling pedal is stepped on, the shovel 100 moves backward with the front side of the upper turning body 3 being positioned rearward in the traveling direction.

To be more specific, in the forward traveling mode, when the traveling lever 26D is tilted forward or when the front side (claw tip side) of the traveling pedal is stepped on, the traveling hydraulic motor 2M rotates in the first direction (forward direction), whereby the shovel 100 moves forward with the front side of the upper turning body 3 being positioned forward in the traveling direction. When the traveling lever 26D is tilted backward or when the rear side (heel side) of the traveling pedal is stepped on, the traveling hydraulic motor 2M rotates in the second direction (reverse direction), whereby the shovel 100 moves backward with the rear side of the upper turning body 3 being positioned rearward in the traveling direction.

On the other hand, in the backward traveling mode, when the traveling lever 26D is tilted forward (when pushed in a direction away from the operator) or when the front side (claw tip side) of the traveling pedal is stepped on, the traveling hydraulic motor 2M rotates in the second direction (reverse direction), whereby the shovel 100 moves forward with the rear side of the upper turning body 3 being positioned forward in the traveling direction. When the traveling lever 26D is tilted rearward or when the rear side (heel side) of the traveling pedal is stepped on, the traveling hydraulic motor 2M rotates in the first direction (forward direction), whereby the shovel 100 moves rearward with the front side of the upper turning body 3 being positioned rearward in the traveling direction.

The traveling direction switching unit 30A is configured to be able to switch the traveling mode based on the selection signal of the traveling direction.

The selection signal of traveling direction is a signal generated based on an input of an operator, and includes a forward traveling selection signal and a backward traveling selection signal. For example, the operator in the remote control room RC can input a desired selection signal to the controller 30 by using a predetermined switch or the switch NS constituting the information input device 72. Specifically, the operator can alternatively input the forward traveling selection signal or the backward traveling selection signal to the controller 30 by operating a switch for selecting the traveling mode.

The traveling direction switching unit 30A switches the traveling mode to the forward traveling mode when the forward traveling selection signal is input, and switches the traveling mode to the backward traveling mode when the backward traveling selection signal is input.

To be more specific, after the traveling mode is switched from the forward traveling mode to the backward traveling mode, the traveling direction switching unit 30A causes the current command output from the controller 30 to the proportional valve 31EL to be output to the proportional valve 31ER in the forward traveling mode, and causes the current command output from the controller 30 to the proportional valve 31ER to be output to the proportional valve 31EL in the forward traveling mode. Similarly, after the traveling mode is switched from the forward traveling mode to the backward traveling mode, the traveling direction switching unit 30A causes the current command output from the controller 30 to the proportional valve 31FL to be output to the proportional valve 31FR in the forward traveling mode, and causes the current command output from the controller 30 to the proportional valve 31FR to be output to the proportional valve 31FL in the forward traveling mode.

Figure 7:
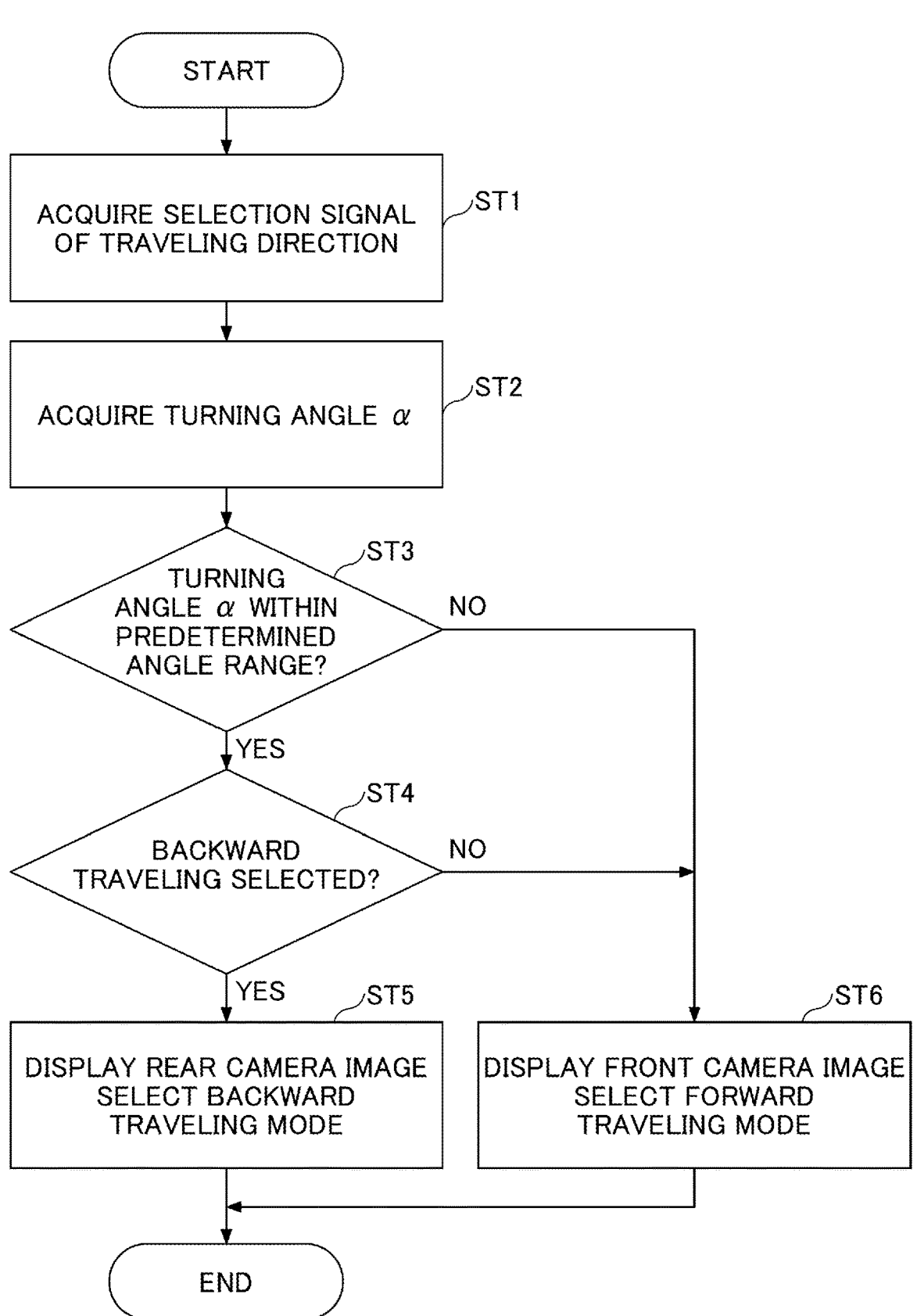
FIG. 7 is a flowchart illustrating an example of a flowchart of a traveling mode selection process.

Here, referring to FIG. 7, a process (hereinafter referred to as a "traveling mode selection process") in which controller 30 selects a traveling mode is performed. Hereinafter, an example of the flow of the process will be described. FIG. 7 is a flowchart illustrating an example of a flow of a traveling mode selection process. The controller 30 is configured to repeatedly execute the traveling mode selection processing at a predetermined control cycle.

First, the controller 30 acquires a selection signal of the traveling direction (step ST1). In the present embodiment, the traveling direction switching unit 30A of the controller 30 acquires, via the communication device 74, a selection signal generated in response to a predetermined operation performed by the operator in the remote control room RC. The predetermined operation by the operator in the remote control room RC is, for example, an operation of a predetermined switch constituting the information input device 72 in the remote control room RC, an operation of the switch NS provided on the left operation lever 26L in the remote control room RC, or the like.

Further, the controller 30 acquires a turning angle $\alpha$ (step ST2). The turning angle $\alpha$ is an angle formed between the longitudinal axis of the lower traveling body 1 and the longitudinal axis of the upper turning body 3 in a top view. Specifically, in a case where the longitudinal axis of the lower traveling body 1 and the longitudinal axis of the upper turning body 3 coincide with each other, the turning angle $\alpha$ becomes 0 degrees when the front side of the lower traveling body 1 and the front side of the upper turning body 3 are aligned with each other, and the turning angle $\alpha$ becomes +180 degrees when the front side of the lower traveling body 1 and the rear side of the upper turning body 3 coincide with each other. In the present embodiment, the turning angle $\alpha$ is represented by a value from −180 degrees to +180 degrees, increases from degrees to +180 degrees when the upper turning body 3 rotates clockwise in a top view, and decreases from 0 degrees to −180 degrees when the upper turning body 3 rotates counterclockwise in a top view.

In the present embodiment, the traveling direction switching unit 30A calculates the turning angle $\alpha$ based on the output of the direction detection device 71.

Thereafter, the controller 30 determines whether or not the turning angle α is within a predetermined angle range (step ST3). In the present embodiment, the predetermined angle range includes an angle range of −5 degrees or more and +5 degrees or less, an angle range of −180 degrees or more and −175 degrees or less, and an angle range of +175 degrees or more and +180 degrees or less. That is, the traveling direction switching unit 30A determines whether or not the relative deviation angle between the longitudinal axis of the lower traveling body 1 and the longitudinal axis of the upper turning body 3 is equal to or less than the threshold value (5 degrees). The threshold value may be larger than 5 degrees or smaller than 5 degrees.

When the turning angle α is determined within the predetermined angle range (YES in step ST3), the controller 30 determines whether or not backward traveling is selected (step ST4). In the present embodiment, the traveling direction switching unit 30A determines whether or not the backward traveling is selected by the operator of the remote control room RC based on whether the selection signal of the traveling direction is the forward traveling selection signal or the backward traveling selection signal.

When it is determined that the backward traveling is selected (YES in step ST4), the controller displays the image of the rear camera 70B on the display device D1 and selects the backward traveling mode as the traveling mode (step ST5). In the present embodiment, when the backward traveling selection signal is received from the remote control room RC, the traveling direction switching unit 30A determines that the backward traveling is selected by the operator in the remote control room RC. Then, the traveling direction switching unit 30A transmits the image captured by the rear camera 70B to the display device D1 in the remote control room RC via the communication device 74. When the traveling mode is switched from the forward traveling mode to the backward traveling mode, the controller 30 can switch the image displayed on the main screen (front screen) of the display device D1 for the seat in the remote control room RC from the image captured by the front camera 70F to the image captured by the rear camera 70B. In addition, switching between the image from the front camera 70F and the image from the rear camera 70B displayed on the main screen may be performed using an independent switch (a switch for switching the main screen display mode or the like) different from the switch for switching the traveling mode. In this way, the image from the front camera 70F and the image from the rear camera 70B are switchably displayed on the main screen.

On the other hand, when it is determined that the forward traveling is selected (NO in step ST4), the controller 30 displays the image of the front camera 70F on the display device D1 and selects the forward traveling mode as the traveling mode (step ST6). In the present embodiment, when the forward traveling selection signal is received from the remote control room RC, the traveling direction switching unit determines that the forward traveling is selected by the operator in the remote control room RC. Alternatively, when the backward traveling selection signal is not received from the remote control room RC, the traveling direction switching unit 30A may determine that the forward traveling is selected by the operator in the remote control room RC. Then, the traveling direction switching unit 30A transmits the image captured by the front camera 70F to the display device D1 in the remote control room RC via the communication device 74. As described above, when the traveling mode is switched from the backward traveling mode to the forward traveling mode, the controller 30 can switch the image displayed on the main screen (front screen) of the display device D1 for the seat in the remote control room RC from the image captured by the rear camera 70B to the image captured by the front camera 70F.

When the turning angle α is determined out of the predetermined angle range (NO in step ST3), the controller 30 executes step ST6 without determining whether or not backward traveling is selected. This is to prevent backward traveling from being performed in a state in which the turning angle α is large.

However, the acquisition of the turning angle α (step ST2) and the determination of whether or not the turning angle α is within the predetermined angle range (step ST3) may be omitted.

By executing the traveling mode selection processing as described above, the controller 30 enables the operator in the remote control room RC to execute backward traveling as necessary. Therefore, the operator can cause the shovel 100 to travel backward as necessary. In this case, the operator can move the shovel 100 while visually recognizing the image captured by the rear camera 70B and not having a blind spot due to the attachment.

The setting unit 30B is configured to assist the operator in setting various kinds of information. In the present embodiment, the setting unit 30B is configured to assist the operator in setting information necessary for causing the shovel 100 to autonomously travel.

For example, the setting unit 30B is configured to assist the operator in setting the destination. The destination is a destination when the shovel 100 autonomously travels. That is, the destination is set as the final target position. In the present embodiment, the setting unit 30B is configured to display a setting screen on the display device D1 including a touch panel when a predetermined switch constituting the information input device 72 is operated. The setting screen is, for example, a map image including the current position of the shovel 100. The map image may be an image captured by a camera. For example, the operator may set the destination by performing a tap operation on a point on the map image corresponding to a desired destination. The setting unit 30B may cause the map image used on the setting screen to be displayed using an Application Programming Interface (API) related to a route search, a map, or the like published on an external website. Then, the setting unit 30B may derive the construction state based on the information acquired by the information acquiring device E1 and reflect the derived construction state on the map image. For example, the setting unit 30B may simultaneously display the place where the banking is performed and the place where the compaction work is performed on the map image. Then, the operator may set the traveling route in consideration of the derived construction situation. Furthermore, the setting unit 30B may divide the range from the current position to the destination into a plurality of sections and set the target position for each section. In this case, when the shovel 100 reaches the end (end point) of the first section, the target position used in the travel control of the shovel 100 is changed (reset) to the end (end point) of the next section. In this way, the controller 30 is configured to be able to continuously execute the travel control in each section. When the shovel 100 reaches the end (end point) of the first section, if the traveling route is changed depending on the situation, the traveling course and the target position of the next section are also changed.

Further, the setting unit 30B is configured to assist the setting of the traveling route by the operator. The traveling route is a path from the current position of the shovel 100 to a desired destination. For example, the shovel 100 autonomously travels such that a trajectory drawn by a predetermined part of the shovel 100 coincides with the traveling route. In this case, the predetermined part is, for example, a center point of the shovel 100. The center point of the shovel 100 is, for example, a point on the pivot axis of the shovel 100 located at a predetermined height from the ground contact surface of the shovel 100.

In the present embodiment, for example, the operator sets a desired traveling route by dragging a finger on the setting screen so as to connect a point on the map image corresponding to the current position of the shovel 100 and a point on the map image corresponding to a desired destination. The setting unit 30B may set a point corresponding to a point at which the operator's finger is separated from the touch panel as the destination. In this case, the operator can simultaneously set the traveling route and the destination without setting the destination in advance.

When the display device D1 does not include a touch panel, the operator may set the destination and the traveling route while moving a cursor using a button or the like on a switch panel.

Alternatively, when the destination is set, the setting unit 30B may automatically set the traveling route based on the current position of the shovel 100, the destination, and the map information. In this case, the map information includes, for example, information regarding unevenness of the ground, information regarding features such as paved roads, unpaved roads, buildings, rivers, and ponds, and the like. For example, the setting unit 30B may recognize the latest construction situation including the position of an obstacle such as a hole, banking, material, and earth and sand (for example, earth and sand unloaded from a dump truck or the like) on the basis of information acquired by the information acquiring device E1 including the communication device, the space recognizing device 70, or the like, and then set a traveling route avoiding the obstacle. The materials include sandbags, tetrapots (registered trademark), concrete blocks, sheet piles, and the like. In this way, the setting unit 30B can set the traveling route in consideration of the latest construction situation.

Alternatively, the setting unit 30B may set the traveling route based on the past traveling trajectory. In this case, the controller 30 may be configured to store the traveling trajectory of the shovel 100 in the non-volatile storage medium for a predetermined time.

The autonomous control unit 30C is configured to autonomously operate the shovel 100. In the present embodiment, the autonomous control unit 30C is configured to cause the shovel 100 to autonomously travel along the traveling route set by the setting unit 30B.

For example, the autonomous control unit 30C may cause the shovel 100 to start autonomous traveling when an autonomous traveling switch on a switch panel provided in proximity to the display unit of the display device D1 is pressed. The autonomous travel switch may be a software button displayed on a display device D1 including a touch panel. Alternatively, the autonomous control unit 30C may cause the shovel 100 to start autonomous traveling when the traveling lever 26D is tilted in a state in which a switch provided at the tip of the traveling lever 26D is pressed. Alternatively, the autonomous control unit may cause the shovel 100 to start autonomous traveling when a predetermined operation is performed on a communication terminal carried by an operator outside the cabin 10. The operator of the shovel 100 can start autonomous traveling of the shovel 100 by pressing the autonomous traveling switch, for example, at the time of refueling or at the time of finishing work, and cause the shovel 100 located at a construction site to autonomously travel to a predetermined position.

For example, the autonomous control unit 30C determines how to move the actuators based on the set traveling route. For example, when the shovel 100 is caused to travel, an appropriate traveling method is selected from a spin turn, a pivot turn, a gentle turn, and a straight travel to determine how to move the traveling hydraulic motor 2M. At this time, the autonomous control unit 30C may determine not only how to move the travel actuators such as the traveling hydraulic motor 2M but also whether or not the turning mechanism 2 needs to be operated. This is to cause the shovel 100 to travel in an appropriate posture while preventing contact between the shovel 100 and an external object. Further, it may be determined whether or not the excavation attachment AT is likely to come into contact with a peripheral device or another construction machine, and whether or not the excavation attachment AT needs to be operated may be determined.

In the present embodiment, the autonomous control unit 30C can autonomously operate the actuators by giving current commands to the proportional valves 31 and individually adjusting the pilot pressures acting on the control valves corresponding to the actuators. For example, the left traveling hydraulic motor 2ML can be operated regardless of whether or not the left traveling lever 26DL is tilted, and the right traveling hydraulic motor 2MR can be operated regardless of whether or not the right traveling lever 26DR is tilted. Similarly, the left traveling hydraulic motor 2ML can be operated regardless of whether or not the left traveling pedal is stepped on, and the right traveling hydraulic motor 2MR can be operated regardless of whether or not the right traveling pedal is tilted. The same applies to the arm cylinder 8 and the turning hydraulic motor 2A associated with the left operation lever 26L and the boom cylinder 7 and the bucket cylinder 9 associated with the right operation lever 26R.

To be more specific, the autonomous controller unit 30C is configured to output a current command to the proportional valve 31EL to adjust the pilot pressure acting on the left pilot port of the control valve 171, as illustrated in FIG. 5A. With this configuration, even when neither the left traveling lever 26DL nor the left traveling pedal is operated in the forward direction, the same pilot pressure as that when at least one of the left traveling lever 26DL and the left traveling pedal is actually operated in the forward direction can be generated, and the left traveling hydraulic motor 2ML can be rotated in the forward direction. The same applies to the case where the left traveling hydraulic motor 2ML is rotated in the reverse direction and the case where the right traveling hydraulic motor 2MR is rotated in the forward direction or the reverse direction.

The autonomous control unit 30C may be configured to repeatedly acquire the information regarding the position of the shovel 100 based on the output of the position measurement device 73 at a predetermined control cycle. Further, the information on the relative relationship between the direction of the upper turning body 3 and the direction of the lower traveling body 1 may be repeatedly acquired at a predetermined control period based on the output of the direction detection device 71. Then, the autonomous control unit 30C may be configured to feed back the acquired information so that the shovel 100 can continue traveling along a desired route in a desired posture.

With this configuration, for example, the autonomous control unit 30C can cause the lower traveling body 1 to travel in a state where the direction of the upper turning body 3 and the direction of the lower traveling body 1 are aligned with each other. Therefore, for example, when the shovel 100 autonomously travels over a relatively long distance, it is possible to stabilize the traveling posture of the shovel 100.

Alternatively, the autonomous control unit 30C can cause the lower traveling body 1 to travel in a state where the direction of the upper turning body 3 and the direction of the lower traveling body 1 are different from each other. Therefore, for example, when the shovel 100 autonomously travels a relatively short distance, such as when the shovel 100 is intermittently moved along a slope, the shovel 100 can be moved in a short time. This is because the time required for aligning the direction of the upper turning body 3 and the direction of the lower traveling body 1 can be omitted.

The traveling direction switching unit 30A may be configured to switch the traveling mode based on the information on the set traveling route. For example, the traveling direction switching unit 30A may switch the traveling mode to the backward traveling mode when the scheduled traveling distance of the autonomous traveling executed by the autonomous control unit 30C is equal to or longer than a predetermined distance. The scheduled traveling distance is, for example, the total distance of the set traveling route. The predetermined distance may be a value registered in advance, or may be a value set dynamically.

Figure 8:
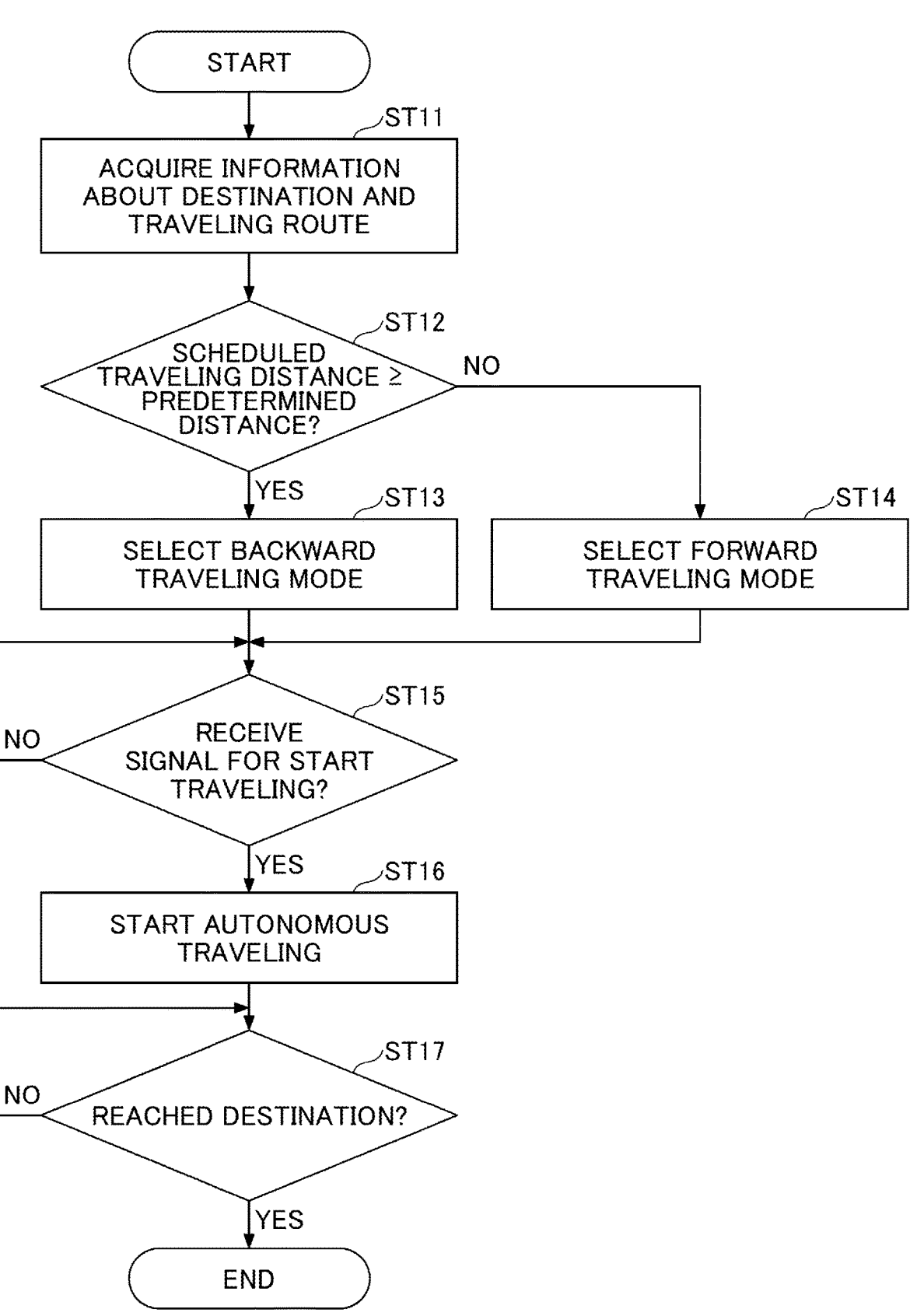
FIG. 8 is a flowchart illustrating an example of a flowchart of autonomous traveling processing.

Here, with reference to FIG. 8, a process in which the controller 30 causes the shovel 100 to autonomously travel (hereinafter, referred to as an "autonomous traveling process") will be described. Hereinafter, an example of the flow of the process will be described. FIG. 8 is a flowchart illustrating an example of a flow of autonomous traveling processing. The controller 30 is configured to execute the autonomous traveling process when a predetermined operation is performed. The predetermined operation is, for example, an input operation to a predetermined switch constituting the information input device 72.

First, the controller 30 acquires information on a destination and a traveling route (step ST11). In the present embodiment, the controller acquires information on the destination and the traveling route set by the operator in the remote control room RC assisted by the setting unit 30B.

Thereafter, the controller 30 determines whether or not the scheduled traveling distance is equal to or longer than a predetermined distance (step ST12). In the present embodiment, the scheduled traveling distance is a moving distance of the shovel 100 by autonomous traveling to be executed by the autonomous control unit 30C.

When it is determined that the scheduled traveling distance is equal to or longer than the predetermined distance (YES in step ST12), the controller 30 selects the backward traveling mode (step ST13). In the present embodiment, the traveling direction switching unit 30A of the controller 30 switches the traveling mode to the backward traveling mode. When the backward traveling mode is selected, the traveling direction switching unit 30A may transmit the image captured by the rear camera 70B to the display device D1 in the remote control room RC via the communication device 74. As described above, when the traveling mode is switched from the forward traveling mode to the backward traveling mode, the controller 30 can switch the image displayed on the main screen (front screen) of the display device D1 for the seat in the remote control room RC from the image captured by the front camera 70F to the image captured by the rear camera 70B.

On the other hand, when it is determined that the scheduled traveling distance is less than the predetermined distance (NO in step ST12), the controller 30 selects the forward traveling mode (step ST14). In the present embodiment, the traveling direction switching unit 30A switches the traveling mode to the forward traveling mode. When the forward traveling mode is selected, the traveling direction switching unit 30A may transmit the image captured by the front camera 70F to the display device D1 in the remote control room RC via the communication device 74. As described above, when the traveling mode is switched from the backward traveling mode to the forward traveling mode, the controller 30 can switch the image displayed on the main screen (front screen) of the display device D1 for the seat in the remote control room RC from the image captured by the rear camera 70B to the image captured by the front camera 70F.

Thereafter, the controller 30 determines whether or not a signal for start traveling has been received (step ST15). In the present embodiment, the controller 30 receives a signal for start traveling generated in response to a predetermined operation by an operator in the remote control room RC, via the communication device 74. The predetermined operation by the operator in the remote control room RC is, for example, an operation of a predetermined switch (autonomous traveling switch) constituting the information input device 72 in the remote control room RC, an operation of the switch NS provided on the left operation lever 26L in the remote control room RC, or the like.

When it is determined that the signal for start traveling is not received (NO in step ST15), the controller 30 stands by until the signal for start traveling is received.

When it is determined that the signal for start traveling is received (YES in step ST15), the controller 30 starts autonomous traveling (step ST16). In the present embodiment, the autonomous control unit of the controller 30 causes the shovel 100 to autonomously travel by outputting a current command to at least one of the proportional valves 31EL, 31ER, 31FL, and 31FR and operating at least one of the left traveling hydraulic motor 2ML and the right traveling hydraulic motor 2MR.

Thereafter, the controller 30 determines whether or not the shovel 100 has reached the destination (step ST17).

When it is determined that the shovel 100 has not reached the destination (NO in Step ST17), the controller 30 continues autonomous traveling until the shovel 100 reaches the destination.

Thereafter, when it is determined that the shovel has reached the destination (YES in step ST17), the controller 30 stops the autonomous traveling. In the present embodiment, the autonomous control unit 30C stops the motion of the traveling hydraulic motor 2M by stopping the output of the current command to the proportional valves 31EL, 31ER, 31FL, and 31FR.

By executing the autonomous traveling process as described above, the controller 30 can automatically move the shovel 100 to the destination. Therefore, the controller 30 can reduce the burden on the operator in the remote control room RC.

Figure 9:
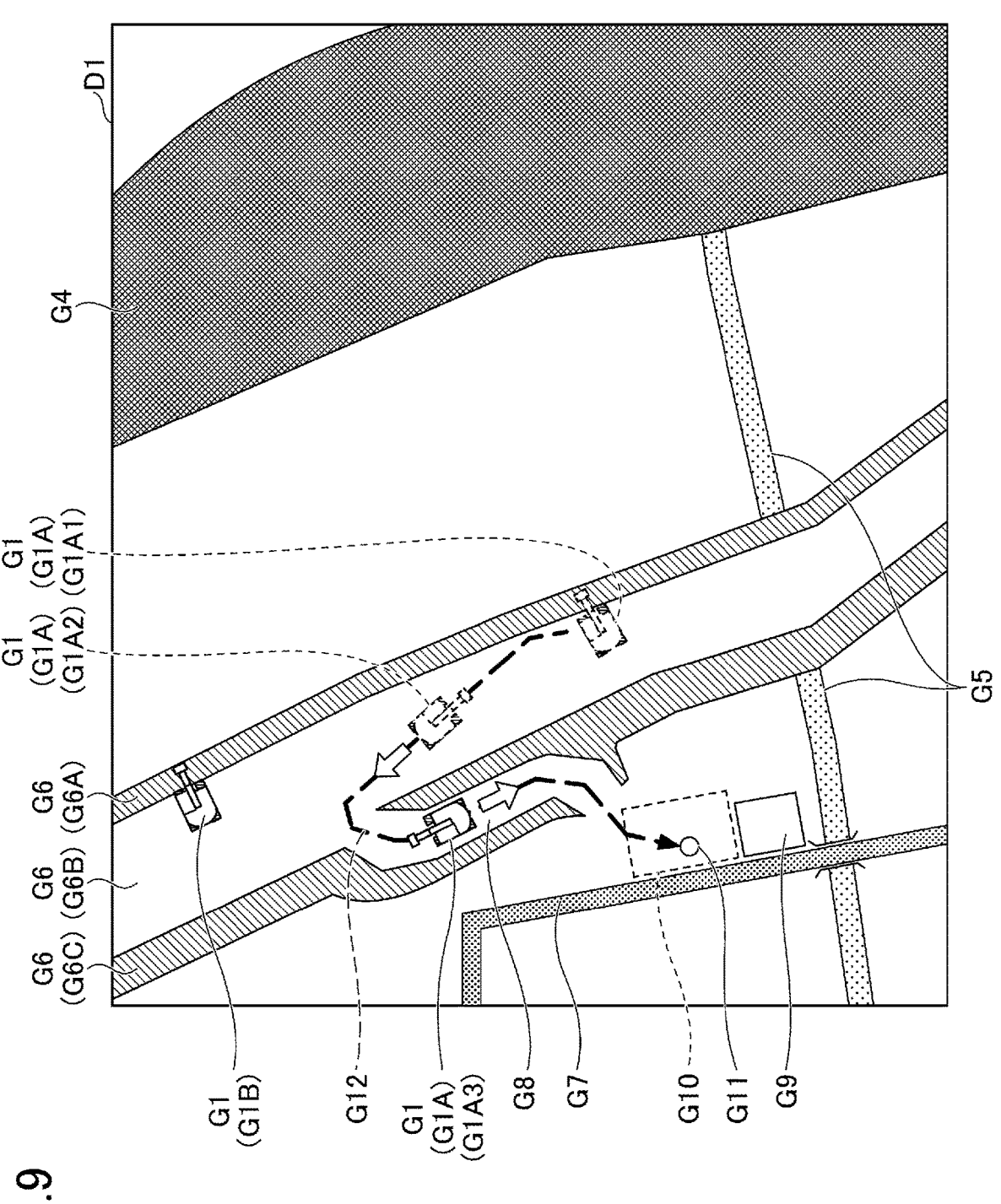
FIG. 9 is a diagram illustrating a display example of a setting screen.

Next, a process in which the controller 30 sets a traveling route will be described with reference to FIG. 9. FIG. 9 illustrates a display example of the setting screen GS displayed on the display device D1.

The setting screen GS includes a shovel graphic G1, a river graphic G4, an irrigation canal graphic G5, a bank graphic G6, a paved road graphic G7, an unpaved road graphic G8, an office graphic G9, a parking space graphic G10, a destination graphic G11, and a travel route graphic G12.

The actual road corresponding to the paved road graphic G7 on the setting screen GS becomes a search target by APIs related to route search and the like disclosed on an external website. However, there are many cases where roads are not laid near a construction site of the shovel 100. For this reason, the controller 30 may not be able to set a traveling route for moving the shovel 100 from the current position to the destination only by using the route search function of the API. Therefore, in the present embodiment, a configuration will be described in which a traveling route can be set even at the construction site of the shovel 100 and the shovel 100 can be moved based on the set route.

The shovel graphic G1 is a graphic indicating the position of the shovel 100. In the example of FIG. 9, the shovel 100 includes a shovel 100A as a reference machine on which the display device D1 is installed and a shovel 100B as another machine working around the shovel 100A. The setting screen GS includes a shovel graphic G1A corresponding to the shovel 100A and a shovel graphic G1B corresponding to the shovel 100B. The shovel graphic G1A indicates the position of the shovel 100A. The shovel graphic G1B indicates the position of the shovel 100B. The controller 30 determines the display position of the shovel graphic G1A based on, for example, the output of the position measurement device 73 mounted on the shovel 100A. The same applies to the shovel graphic G1B. It should be noted that the shovel graphic G1A includes a shovel graphic G1A1 indicating a position of the shovel 100A at a first time point, a shovel graphic G1A2 indicating a position of the shovel 100A at a second time point after the first time point, and a shovel graphic G1A3 indicating a position of the shovel 100A at a third time point after the second time point. Furthermore, FIG. 9 illustrates the motion of the shovel 100A when the backward traveling mode is selected as the traveling mode.

The river graphic G4, the irrigation canal graphic G5, the bank graphic G6, the paved road graphic G7, the unpaved road graphic G8, the office graphic G9, and the parking space graphic G10 are figures generated based on the map information. The above may be a part of the map image. It should be noted that the bank graphic G6 includes a graphic G6A of a slope (front slope) on the river side, a graphic G6B of an upper surface (top end surface) of the bank, and a graphic G6C of a slope (back slope) on the urban area side.

The destination graphic G11 is a graphic displayed when the setting unit 30B sets a destination. For example, it is displayed when the inside of the parking space graphic G10 which is a broken line frame is tapped by the operator. In the example of FIG. 9, the destination graphic G11 is a circular mark, but may be a mark having another shape such as a triangle, a rectangle, or an ellipse.

The travel route graphic G12 is a linear graphic displayed when the setting unit 30B sets a traveling route. For example, when a drag operation is performed from a position where the shovel graphic G1A1 is displayed, the travel route graphic G12 is displayed along a trajectory of the drag operation. Then, the touch panel ends at a point where the finger is separated from the touch panel. In the example of FIG. 9, it is displayed as a broken line arrow toward the destination graphic G11.

The construction site of the shovel 100 is different from a place where a road is laid or the like, and the stability of the ground may be uneven. Therefore, it is desirable to use a traveling route that has been passed once in the past.

Therefore, the setting unit 30B may set the traveling route such as the shortest route based on the traveling trajectory in the past operation.

In addition, when the setting unit 30B determines that the trajectory of the drag operation is inappropriate, the setting unit 30B may indicate that the trajectory of the drag operation is inappropriate on the setting screen GS without displaying the traveling route graphic G12. This is to prompt the operator to set an appropriate travel route. For example, when the drag operation is performed so as to cross the river graphic G4, the setting unit 30B determines that the trajectory of the drag operation is inappropriate.

Thereafter, when the autonomous travel switch is pressed, the autonomous control unit 30C causes the shovel 100A to autonomously travel along the set traveling route. In the present embodiment, the traveling direction switching unit 30A selects the backward traveling mode as the traveling mode when the total distance of the set traveling route is equal to or greater than a predetermined distance, and selects the forward traveling mode as the traveling mode when the total distance of the set traveling route is less than the predetermined distance. The shovel 100A determines the positions of materials, sandbags, steps, mounds, holes, and the like based on the information acquired by the information acquiring device E1, and travels to a point corresponding to the destination graphic G11 along the traveling route while autonomously avoiding the materials, sandbags, steps, mounds, holes, and the like. When the backward traveling mode is selected, the rear camera 70B as the information acquiring device E1 can image (monitor) the front side in the traveling direction without being blocked by a structure such as an attachment. This is because a structure such as an attachment is not attached to the rear side of the upper turning body 3. Therefore, the controller 30 can cause the shovel 100 to travel while accurately recognizing the situation forward in the traveling direction.

The setting screen GS may be continuously displayed while the shovel 100A is performing autonomous traveling. This is to enable the operator to grasp the moving state of the shovel 100A.

In the example of FIG. 9, the river graphic G4, the irrigation canal graphic G5, the bank graphic G6, the paved road graphic G7, the unpaved road graphic G8, the office graphic G9, and the parking space graphic G10 on the setting screen GS may be images captured by a flying object such as a quadcopter or the like.

With this configuration, the operator of the shovel 100A can cause the shovel 100A to autonomously travel to the destination only by setting the traveling route to the destination.

As described above, the shovel 100 according to the embodiment of the present disclosure includes the lower traveling body 1, the upper turning body 3 turnably mounted on the lower traveling body 1, the traveling hydraulic motors 2M as the traveling actuators for driving the lower traveling body 1, and the controller 30 as the control device provided in the upper turning body 3. The controller 30 is configured to determine the forward and backward of the traveling direction in accordance with the direction of the upper turning body 3, and to perform travel control so that the rear of the upper turning body 3 is to be positioned forward in the traveling direction.

With this configuration, the controller 30 can more appropriately move the shovel 100 compared to a case where the shovel 100 is moved forward so that the front side of the upper turning body 3 is to be positioned forward in the traveling direction. This is because when the shovel 100 is moved forward so that the rear side of the upper turning body 3 is to be positioned forward in the traveling direction, an image captured by the rear camera 70B and not having a blind spot due to the attachment can be presented to the operator as an image of the forward traveling direction.

The controller 30 may be configured to switch between a forward traveling mode as the first traveling mode and a backward traveling mode as the second traveling mode. In this case, in the forward traveling mode, the controller 30 may move the lower traveling body 1 with the front side of the upper turning body 3 being positioned forward in the traveling direction and the rear side of the upper turning body 3 being positioned rearward in the traveling direction. In the backward traveling mode, the controller 30 may move the lower traveling body 1 with the rear side of the upper turning body 3 being positioned forward in the traveling direction and the front side of the upper turning body 3 being positioned rearward in the traveling direction.

In the forward traveling mode, when the traveling lever 26D as the traveling operation device is operated in the first operating direction (forward direction) (when the traveling lever 26D is tilted forward), the controller 30 may cause the lower traveling body 1 to move forward with the front side of the upper turning body 3 being positioned forward in the traveling direction, and when the traveling lever 26D is operated in the second operating direction (backward direction) opposite to the first operating direction (when the traveling lever 26D is tilted toward an operator), the controller 30 may cause the lower traveling body 1 to move backward with the rear side of the upper turning body 3 being positioned rearward in the traveling direction. In the backward traveling mode, when the traveling lever 26D is operated in the first operating direction (forward direction) (when the traveling lever 26D is tilted forward), the controller 30 may cause the lower traveling body 1 to move forward with the rear side of the upper turning body 3 being positioned forward in the traveling direction, and when the traveling lever 26D is operated in the second operating direction (backward direction) (when the traveling lever 26D is tilted toward an operator), the controller 30 may cause the lower traveling body 1 to move backward with the front side of the upper turning body 3 being positioned rearward in the traveling direction.

In particular, in the forward traveling mode, when the traveling lever 26D is operated in the first operating direction (forward direction), the controller 30 may rotate the traveling hydraulic motor 2M to the first rotation direction, and when the traveling lever 26D is operated in the second operating direction (backward direction), the controller 30 may rotate the traveling hydraulic motor 2M to the second rotation direction opposite to the first rotation direction. In the backward traveling mode, when the traveling lever 26D is operated in the second operating direction (backward direction), the controller 30 may rotate the traveling hydraulic motor 2M to the first rotation direction, and when the traveling lever 26D is operated in the first operating direction (forward direction), the controller 30 may rotate the traveling hydraulic motor 2M to the second rotation direction.

With this configuration, for example, the controller 30 can perform travel control such that the backward traveling mode is selected when the shovel 100 travels over a relatively long distance, and the forward traveling mode is selected when the shovel 100 travels over a relatively short distance. Therefore, the controller 30 can reduce the burden on the operator regarding the traveling operation.

The shovel 100 on which the controller 30 as described above is mounted may be a remote-controlled shovel. In this configuration, even when the backward traveling mode is selected, the operator in the remote control room RC can cause the shovel 100 to travel with the same feeling as when the forward traveling mode is selected. This is because the image displayed on the display device D1 and the operation method of the traveling operation device (for example, whether the traveling hydraulic motor 2M is rotated forward or reversely when the traveling lever 26D is tilted forward) are automatically switched.

In addition, the controller 30 may be configured to allow the shovel 100 to autonomously travel. In this case, the shovel 100 may be an unmanned shovel. That is, the shovel 100 may be an automatic operation shovel that can operate without requiring an operation by an operator.

The preferred embodiments of the present invention have been described above in detail. However, the present invention is not limited to the embodiments described above. Various modifications, substitutions, and the like can be applied to the above-described embodiments without departing from the scope of the present invention. In addition, features described separately may be combined as long as no technical contradiction arises.

The invention claimed is:

1. A shovel comprising:

a lower traveling body;

an upper turning body mounted on the lower traveling body and configured to rotate relative to the lower traveling body;

a traveling actuator configured to drive the lower traveling body;

an image sensor configured to capture an image of a rear of the upper turning body; and a hardware processor provided in the upper turning body, wherein the hardware processor is configured to determine a front and a rear in a traveling direction of the shovel in accordance with a direction of the upper turning body, wherein the hardware processor is configured to switch between a first traveling mode and a second traveling mode, wherein the hardware processor is configured to, in the first traveling mode, cause the lower traveling body to travel with a front of the upper turning body and the rear of the upper turning body being positioned forward and rearward, respectively, in the traveling direction, wherein the hardware processor is configured to, in the second traveling mode, cause the lower traveling body to travel with the rear of the upper turning body and the front of the upper turning body being positioned forward and rearward, respectively, in the traveling direction with the captured image of the rear of the upper turning body being displayed on a display, wherein the hardware processor is configured to determine whether to select the first traveling mode or the second traveling mode based on information on a set traveling route, and wherein the hardware processor is configured to determine whether a scheduled traveling distance of the set traveling route is longer than or equal to a predetermined distance; and select the first traveling mode in response to determining that the scheduled traveling distance is shorter than the predetermined distance and select the second traveling mode in response to determining that the scheduled traveling distance is longer than or equal to the predetermined distance.

2. The shovel according to claim 1,
wherein the hardware processor is configured to, in the first traveling mode, cause the lower traveling body to travel forward with the front of the upper turning body being positioned forward in the traveling direction in response to a traveling operation lever or pedal being operated in a first operation direction and cause the lower traveling body to travel backward with the rear of the upper turning body being positioned rearward in the traveling direction in response to the traveling operation lever or pedal being operated in a second operation direction opposite to the first operation direction; and
wherein the hardware processor is configured to, in the second traveling mode, cause the lower traveling body to travel forward with the rear of the upper turning body being positioned forward in the traveling direction in response to the traveling operation lever or pedal being operated in the first operation direction and cause the lower traveling body to travel backward with the front of the upper turning body being positioned rearward in the traveling direction in response to the traveling operation lever or pedal being operated in the second operation direction.

3. The shovel according to claim 2, further comprising:
a traveling hydraulic motor configured to operate the lower traveling body,
wherein the hardware processor is configured to, in the first traveling mode, rotate the traveling hydraulic motor in a first rotation direction in response to the traveling operation lever or pedal being operated in the first operation direction and rotate the traveling hydraulic motor in a second rotation direction opposite to the first rotation direction in response to the traveling operation lever or pedal being operated in the second operation direction, and
wherein the hardware processor is configured to, in the second traveling mode, rotate the traveling hydraulic motor in the first rotation direction in response to the traveling operation lever or pedal being operated in the second operation direction and rotate the traveling hydraulic motor in the second rotation direction in response to the traveling operation lever or pedal being operated in the first operation direction in the second traveling mode.

4. The shovel according to claim 1, wherein the shovel is a remote-controlled shovel.

5. The shovel according to claim 1, wherein the hardware processor is configured to cause the shovel to autonomously travel in the first traveling mode and in the second traveling mode.

6. A construction assisting system for a shovel including a lower traveling body, an upper turning body mounted on the lower traveling body and configured to rotate relative to the lower traveling body, a traveling actuator configured to drive the lower traveling body, and an image sensor configured to capture an image of a rear of the upper turning body, the construction assisting system comprising:
a hardware processor configured to determine a front and a rear in a traveling direction of the shovel in accordance with a direction of the upper turning body,
wherein the hardware processor is configured to switch between a first traveling mode and a second traveling mode,
wherein the hardware processor is configured to, in the first traveling mode, cause the lower traveling body to travel with a front of the upper turning body and the rear of the upper turning body being positioned forward and rearward, respectively, in the traveling direction,
wherein the hardware processor is configured to, in the second traveling mode, cause the lower traveling body to travel with the rear of the upper turning body and the front of the upper turning body being positioned forward and rearward, respectively, in the traveling direction with the captured image of the rear of the upper turning body being displayed on a display,
wherein the hardware processor is configured to determine whether to select the first traveling mode or the second traveling mode based on information on a set traveling route, and
wherein the hardware processor is configured to
determine whether a scheduled traveling distance of the set traveling route is longer than or equal to a predetermined distance; and
select the first traveling mode in response to determining that the scheduled traveling distance is shorter than the predetermined distance and select the second traveling mode in response to determining that the scheduled traveling distance is longer than or equal to the predetermined distance.

7. The shovel according to claim 1, further comprising another image sensor configured to capture an image of the front of the upper turning body.

8. The construction assisting system according to claim 6, further comprising:
the display;
an operation lever or pedal provided outside the shovel; and
a seat on which an operator who operates the operation lever or pedal sits,
wherein the display includes a main screen disposed in front of the seat, and
wherein the hardware processor is configured to switch an image displayed on the main screen of the display between an image of the front of the upper turning body captured by another image sensor of the shovel and the captured image of the rear of the upper turning body.

9. The shovel according to claim 1, wherein
the hardware processor is further configured to
determine whether a signal for starting traveling has been received; and
start autonomous traveling of the shovel along the set traveling route in the selected first traveling mode or second traveling mode in response to determining that the signal has been received.

10. The shovel according to claim 9, wherein the hardware processor is further configured to stop the autonomous traveling of the shovel in response to determining that the shovel has reached a destination of the set traveling route.

11. The shovel according to claim 1, wherein
the hardware processor is further configured to display, on the display, a setting screen for setting the traveling route, and
the hardware processor is further configured to determine whether to select the first traveling mode or the second traveling mode based on the information on the traveling route manually set on the setting screen.

12. A shovel comprising:
a lower traveling body;
an upper turning body mounted on the lower traveling body and configured to rotate relative to the lower traveling body;

a traveling actuator configured to drive the lower traveling body; and a hardware processor provided in the upper turning body, wherein the hardware processor is configured to determine a front and a rear in a traveling direction of the shovel in accordance with a direction of the upper turning body, wherein the hardware processor is configured to determine whether to select a first traveling mode or a second traveling mode based on information on a set traveling route, wherein the hardware processor is configured to, in response to selecting the first traveling mode, cause the lower traveling body to travel with a front of the upper turning body and a rear of the upper turning body being positioned forward and rearward, respectively, in the traveling direction, wherein the hardware processor is configured to, in response to selecting the second traveling mode, cause the lower traveling body to travel with the rear of the upper turning body and the front of the upper turning body being positioned forward and rearward, respectively, in the traveling direction, and wherein the hardware processor is further configured to determine whether a scheduled traveling distance of the set traveling route is longer than or equal to a predetermined distance; and select the first traveling mode in response to determining that the scheduled traveling distance is shorter than the predetermined distance and select the second traveling mode in response to determining that the scheduled traveling distance is longer than or equal to the predetermined distance.

13. The shovel according to claim 12, wherein the hardware processor is further configured to determine whether a signal for starting traveling has been received; and start autonomous traveling of the shovel along the set traveling route in the selected first traveling mode or second traveling mode in response to determining that the signal has been received.

* * * * *